US009558632B2

(12) United States Patent
Melnick et al.

(10) Patent No.: US 9,558,632 B2
(45) Date of Patent: Jan. 31, 2017

(54) ELECTRONIC GAMING DEVICE WITH CARD TOURNAMENT FUNCTIONALITY

(71) Applicant: Cadillac Jack, Inc., Duluth, GA (US)

(72) Inventors: Scott Andrew Melnick, Decatur, GA (US); Carmen DiMichele, Norcross, GA (US)

(73) Assignee: Cadillac Jack, Inc., Duluth, GA (US)

( * ) Notice: Subject to any disclaimer, the term of this patent is extended or adjusted under 35 U.S.C. 154(b) by 6 days.

(21) Appl. No.: 13/754,485

(22) Filed: Jan. 30, 2013

(65) Prior Publication Data

US 2014/0179395 A1 Jun. 26, 2014

Related U.S. Application Data

(63) Continuation of application No. 13/725,005, filed on Dec. 21, 2012.

(51) Int. Cl.
*A63F 13/00* (2014.01)
*G07F 17/32* (2006.01)
*G07F 17/34* (2006.01)

(52) U.S. Cl.
CPC ............. *G07F 17/326* (2013.01); *G07F 17/34* (2013.01)

(58) Field of Classification Search
CPC .. G07F 17/32; G07F 17/3267; G07F 17/3244; G07F 17/3262
USPC ........................................................ 463/16–20
See application file for complete search history.

(56) References Cited

U.S. PATENT DOCUMENTS

| | | | | |
|---|---|---|---|---|
| 5,807,172 | A * | 9/1998 | Piechowiak | 463/20 |
| 6,120,378 | A * | 9/2000 | Moody et al. | 463/20 |
| 7,883,403 | B2 | 2/2011 | Low et al. | |
| 2004/0176157 | A1 * | 9/2004 | Walker | G07F 17/32 463/16 |
| 2006/0160614 | A1 * | 7/2006 | Walker | G07F 17/32 463/29 |
| 2007/0082725 | A1 * | 4/2007 | Low | G07F 17/32 463/16 |
| 2010/0285869 | A1 * | 11/2010 | Walker et al. | 463/25 |
| 2011/0070940 | A1 * | 3/2011 | Jaffe | G07F 17/32 463/20 |

* cited by examiner

*Primary Examiner* — Omkar Deodhar
*Assistant Examiner* — Eric M Thomas
(74) *Attorney, Agent, or Firm* — Weide & Miller, Ltd.

(57) ABSTRACT

Examples disclosed herein relate to systems and methods, which may receive wagers on one or more paylines. The systems and methods may utilize one or more tournament game structures. The systems and methods may utilize one or more power-up cards in the one or more tournament game structures.

20 Claims, 24 Drawing Sheets

ELECTRONIC GAMING DEVICE WITH CARD TOURNAMENT FUNCTIONALITY

CROSS-REFERENCE TO RELATED PATENT APPLICATION

This application is a continuation of prior application Ser. No. 13/725,005 entitled "ELECTRONIC GAMING DEVICE WITH CARD TOURNAMENT FUNCTIONALITY", filed on Dec. 21, 2012, which is incorporated herein by reference in its entirety.

FIELD

The subject matter disclosed herein relates to an electronic gaming device. More specifically, the disclosure relates to an electronic gaming device, which provides game play for which players have the ability to utilize power-up functionalities (e.g., special skills, attack capabilities, and/or defense capabilities). Further, the disclosure relates to utilizing the power-up functionalities in the base game, the bonus game, and/or a tournament game play to enhance the gaming experience.

Information:

The gaming industry has numerous casinos located both worldwide and in the United States. A client of a casino or other gaming entity can gamble via various games of chance. For example, craps, roulette, baccarat, blackjack, and electronic games (e.g., a slot machine) where a person may gamble on an outcome.

Paylines of an electronic gaming device (e.g., a slot machine) are utilized to determine when predetermined winning symbol combinations are aligned in a predetermined pattern to form a winning combination. A winning event occurs when the player successfully matches the predetermined winning symbols in one of the predetermined patterns. One or more combinations of symbols may generate a bonus game. A new way of delivering game play includes providing the player the ability to either on their own and/or through interaction with other players improve their game outcome by the use of power-up functionalities in a tournament game mode, a normal (e.g., base game) mode, and/or a bonus game mode.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
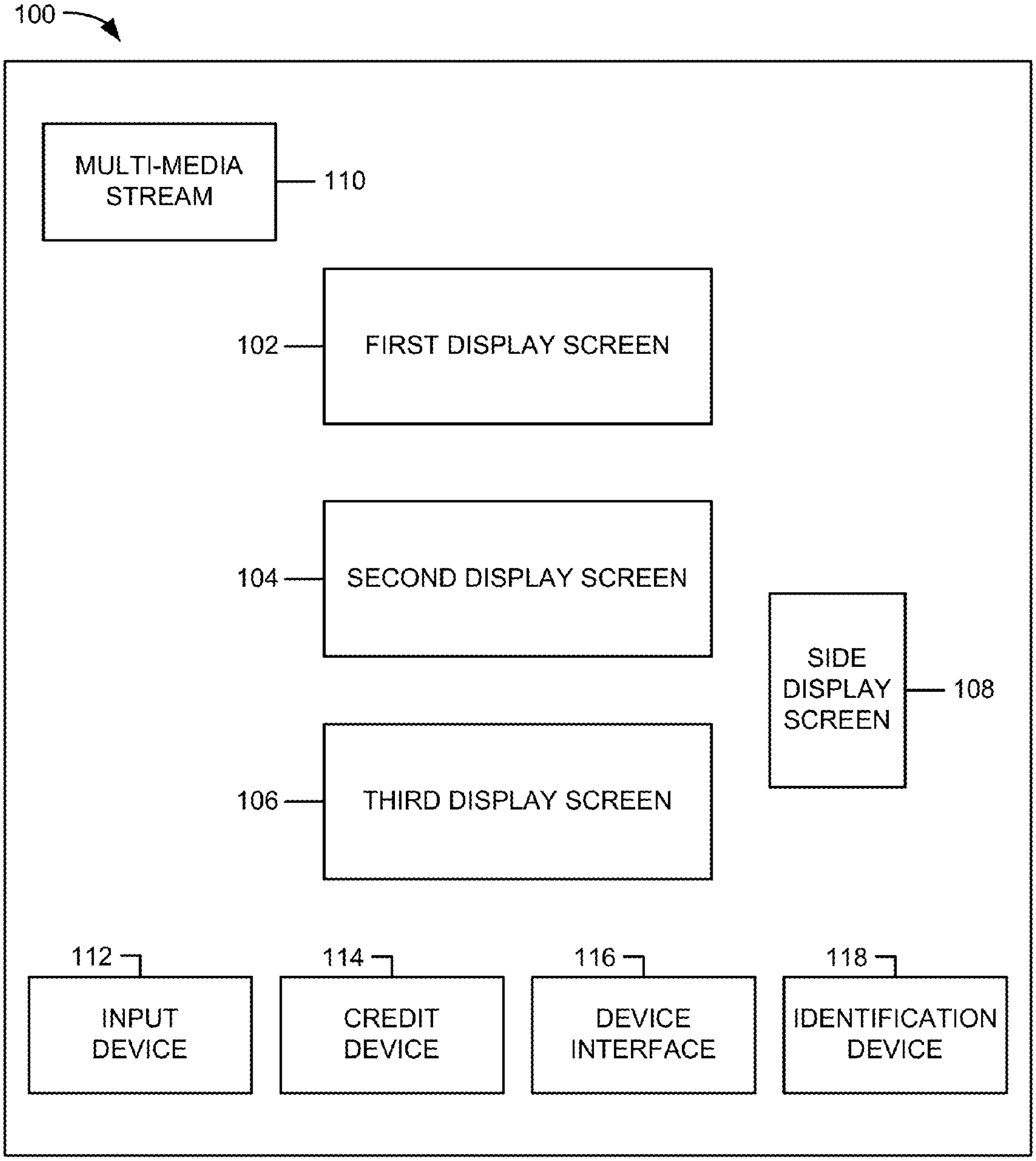
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to make a wager, to control any object (e.g., one or more special skill cards, one or more attack cards, one or more defense cards, etc.), to select one or more power-up gaming options (e.g., a base game mode, a bonus game mode, a tournament game mode, etc.), to obtain data relating to historical payouts, to select a row and/or column to move, to select a row area to move, to select a column area to move, to select a symbol to move, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), and/or any combination thereof. These selections may occur via any other input device (e.g., a touch screen, voice commands, etc.).

A special skill card may be an attack card, a defense card, and/or a combination of an attack card and a defense card. Special skill card may require a player to perform an act to activate the special skill card. In one example, correctly answering a trivia question may be required to activate the special skill card. In another example, the activation of the special skill card may be via one or more of shooting a virtual ball through a virtual net, shooting a virtual animal, and/or any other skill-based activity, semi-skill based activity, and/or perceived-skill based activity.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming device 100. Device interface 116 may include an over the air connection by which a mobile device is connected to electronic gaming device 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more power-up game based functionalities (e.g., one or more special skill cards, one or more attack cards, one or more defense cards, etc.) may be presented, one or more power-up gaming options (e.g., a base game mode, a bonus game mode, a tournament game mode, etc.) may be presented, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, a player may want to have game play which has only power-up game based functionality (or similar functionality). Therefore, no games without power-up game based functionality would be presented. In another example, the player may only want to play games that include pattern gaming options only. Therefore, only games which include pattern gaming options would be presented to the player. In another example, the player may only want to play games that include historical information relating to game play. Therefore, only games which include historical gaming data would be presented to the player.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games and/or secondary (bonus) games, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

The presentations associated with power-up game based game play (e.g., one or more special skill cards, one or more attack cards, one or more defense cards, etc.) may be presented on one, a few, and/or a plurality of screens. These presentations associated with power-up game based game play may be displayed on a portion of one, a few, and/or a plurality of these screens.

For example, a single large image could be partially displayed on second display screen 104 and partially displayed on third display screen 106, so that when both display screens are put together they complete one image. Electronic gaming device 100 may stream or play prerecorded multimedia data, which may be displayed on any display combination.

Figure 2:
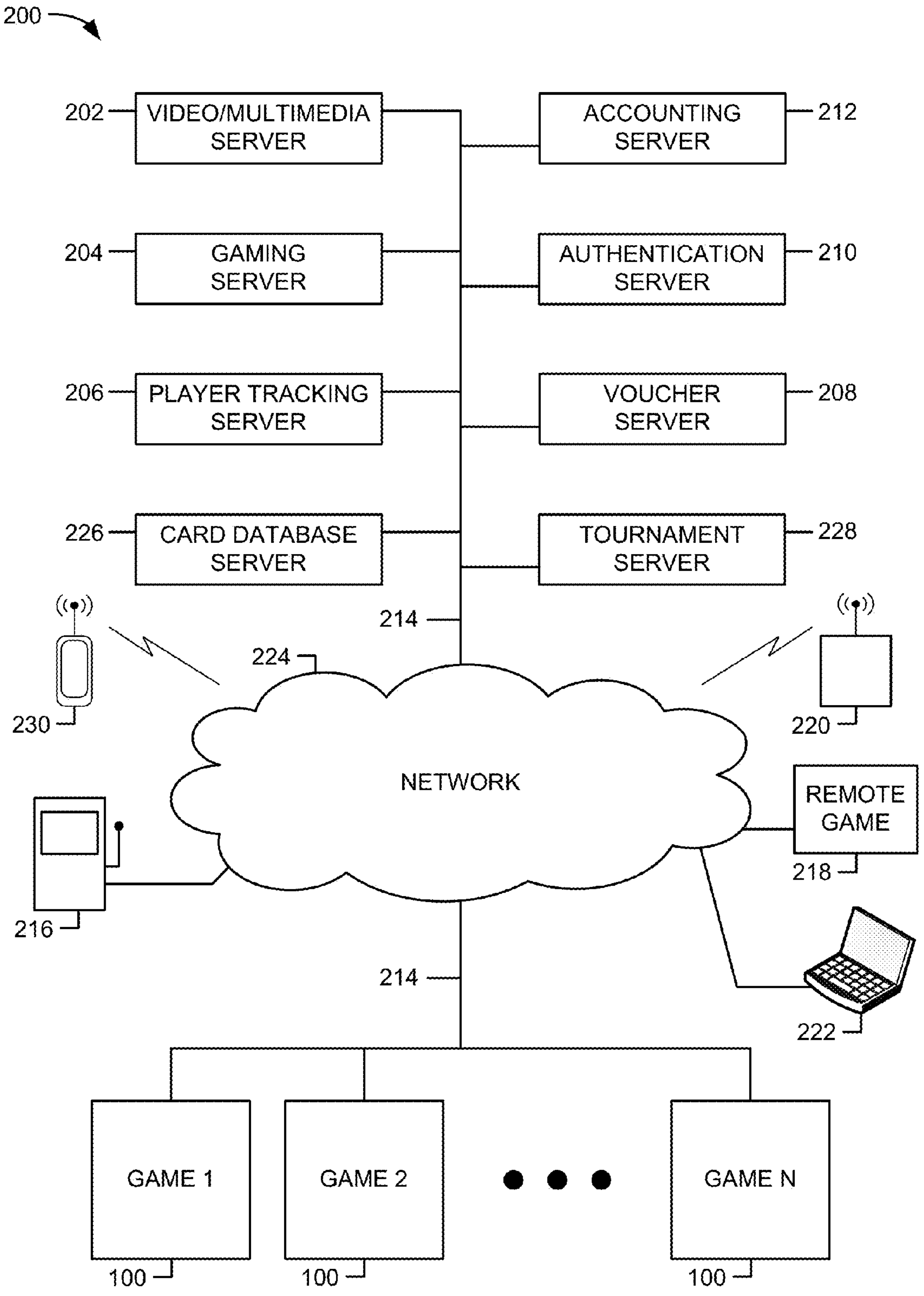
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, and an accounting server 212.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes. Gaming server 204 may provide one or more of a payout functionality, a power-up functionality, a power-up evaluation functionality, other physical game functionality, and/or any other virtual game functionality.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include power-up game based game play data (or similar game play data), repeat payline data, pattern data, historical payout data, column data, row data, and/or symbols that were modified. For example, any remaining and/or banked power-up cards may be displayed on the voucher.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

A statistics server may be used to maintain data relating to historical game play for one or more electronic gaming devices 100. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Statistics server may include data relating to one or more power-up game based game play (or similar game play). This data may include the number of time a specific item (e.g., Special card type 1, Special card type 2, Attack card type 1, Attack card type 2, Defense card type 1, Defense card type 2, etc.) was selected. The frequency of any specific item being selected and the effectiveness of the specific item. For example, Special card type 1 (e.g., steal 100 credits from all players) is effective 99.9% of the time. Whereas, Defense card type 1 (e.g., block spin stealing) is only effective 62% of the time. In one example, Special card type 1 may be move valuable (and/or rare), then Defense card type 2. This data may also include data relating to any interrelationship of elements. For example, when an Attack card type 1 is utilized, a Defense card type 3 is utilized 28% of the time.

Figure 3:
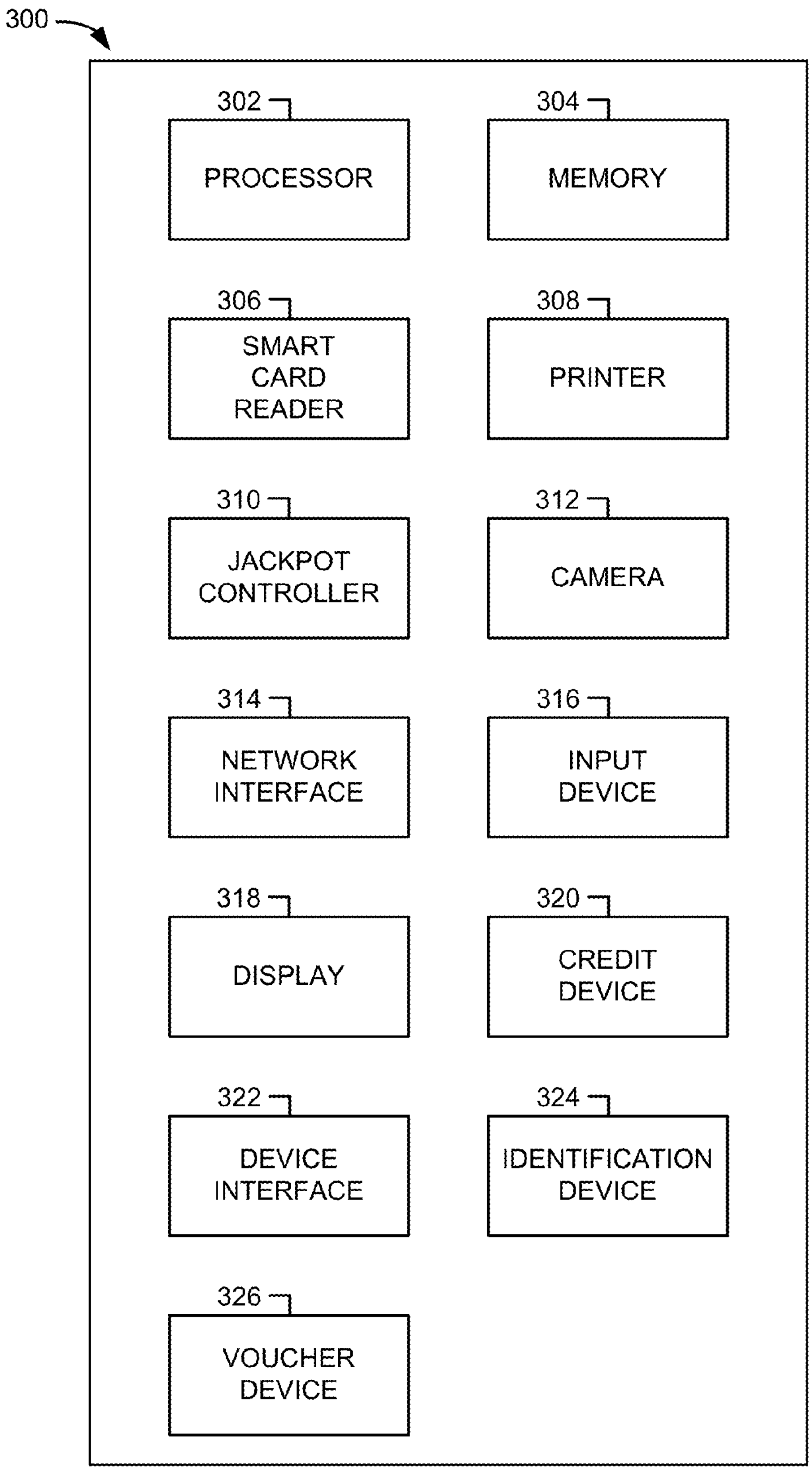
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include his or her image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212.

Input device 316 may be mechanical buttons, electronic buttons, a touch screen, and/or any combination thereof. Input device 316 may be utilized to make a wager, to select one or more game elements, to control any object (e.g., one or more special skill cards, one or more attack cards, one or more defense cards, etc.), to select one or more power-up gaming options (e.g., a base game mode, a bonus game mode, a tournament game mode, etc.), to make an offer to buy, sell, and/or trade a voucher and/or one or more power-up cards, to determine a vouchers worth, to cash in a voucher, to modify electronic gaming device 100 (e.g., change sound level, configuration, font, language, etc.), to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's preestablished account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Figure 4:
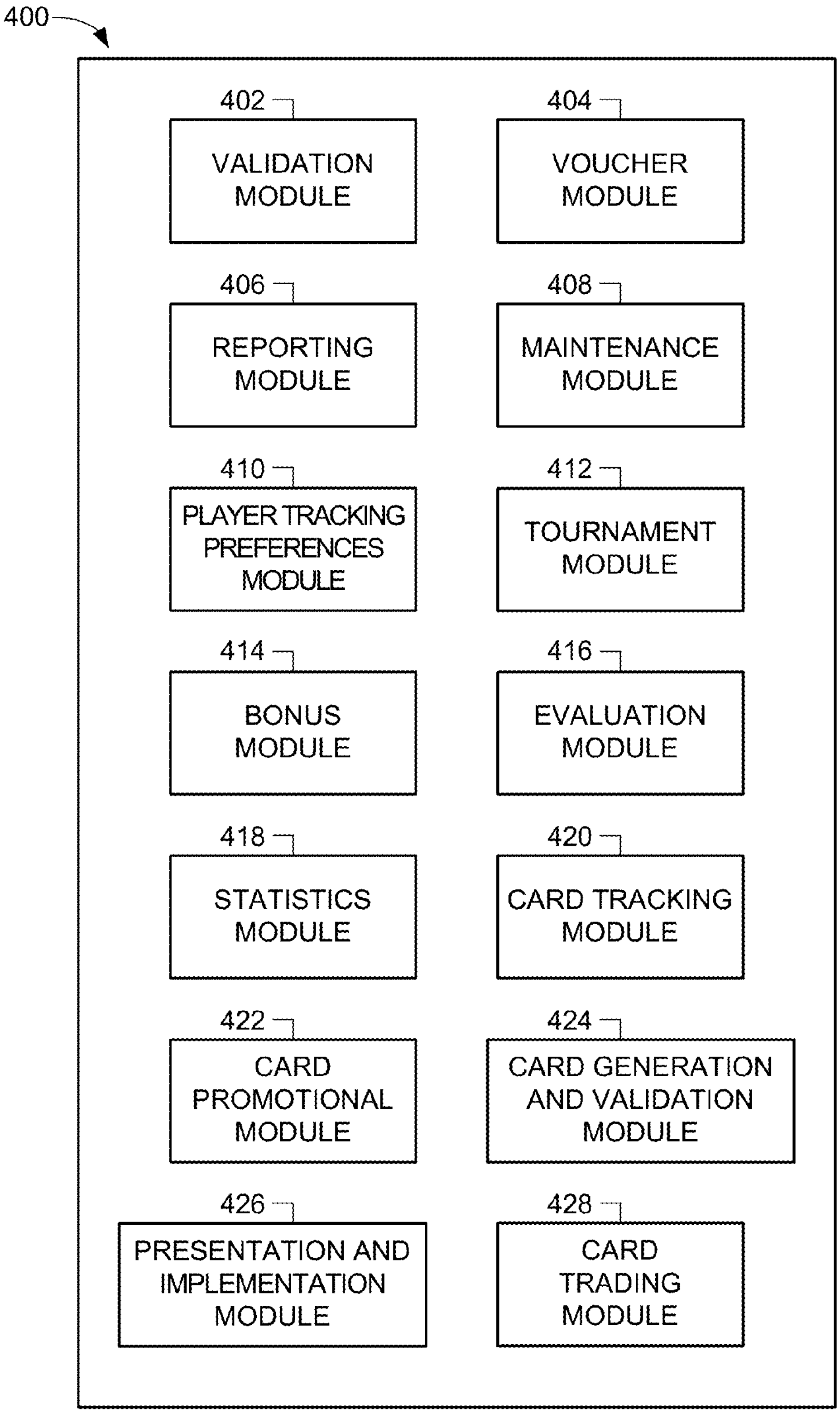
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, a tournament module 412, a bonus module 414, an evaluation module 416, a statistics module 418, a card tracking module 420, a card promotional module 422, a card generation and validation module 424, a presentation generation and implementation module 426, and/or a card trading module 428.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance, request a service call based on a device error, and/or any other reason.

Player tracking preferences module 410 may compile and track data associated with a player's preferences.

Tournament module 412 may generate, compile, transmit, and/or store one or more tournament structures. Tournament module 412 may generate, compile, transmit, and/or store data relating to one or more tournaments. Tournament module 412 may generate historical tournament reports. Tournament module 412 may generate new tournament structures based on historical tournament data (e.g., participation rate, prize pool, the level of players that played in the tournament, monies earned from related events, etc.). For example, one or more tournament structures may be targeted to high rollers. Whereas, other tournament structures may be targeted in middle level players. In another example, other tournament structures may be targeted to beginners.

Bonus module 414 may generate a bonus game, evaluate the results of the bonus game, trigger bonus game presentations, generate bonus game payouts, and/or display any data relating to the bonus game.

Evaluation module 416 may evaluate one or more outcomes for one or more events (e.g., base game mode, bonus game mode, tournament mode, etc.) in one or more gaming options.

Statistics module 418 may generate, compile, transmit, and/or store any statistical data relating to one or more gaming options (e.g., base game mode, bonus game mode, tournament mode, etc.). For example, Special card type 1 (e.g., steal 100 credits from all players) is effective 99.9% of the time. Whereas, Defense card type 1 (e.g., block spin stealing) is only effective 62% of the time. In one example, Special card type 1 may be move valuable (and/or rare), then Defense card type 2. This data may also include data relating to any interrelationship of elements. For example, when an Attack card type 1 is utilized, a Defense card type 3 is utilized 28% of the time.

Card tracking module 420 may track one or more power-up cards, which are available to the player, a few players, a plurality of players, and/or all of the players. Card tracking module 420 may track power-up cards that have been utilized by the player, are in a player's card bank, are at a vendor's location, are assigned to a vendor, are in circulation, are on the trading block, have traded multiple times, are currently being utilized in a tournament, and/or any other ownership and/or movement of one or more power-up cards. Card tracking module 420 may generate historical movement patterns of one or more power-up cards. Card tracking module 420 may generate any other report relating to one or more power-up cards.

Card promotional module 422 may provide power-up cards as part of a promotional activity (e.g., card promotional module 422 may be used at gaming machines, local retail stores, internet sites, and/or anywhere the casino wants to market to current and potential players). For example, the player may be playing electronic gaming device 100 and based on earning a predetermined outcome one or more power-up cards may be earned. In another example, the player may be shopping at a retail store and once a predetermined dollar amount (e.g., $25, $50, $100, etc.) is spent, the player will receive one or more power-up cards. In another example, the player may be shopping at a retail store and purchase a specified item (e.g., TV, computer, tablet, etc.). Based on this specific purchase, the player may receive one or more power-up cards.

Card generation and validation module 424 may generate new power-up cards for the player, validate power-up cards being added by the player, validate cards being traded by players, validate cards being utilized in a tournament, and/or validate power-up cards being deployed by the player in any fashion.

Presentation generation and implementation module 426 may generate the presentation data (e.g., visual and audio)

relating to one or more power-up game play options. A presentation module may display one or more of the generated presentations.

Card trading module 428 may provide a place (e.g., virtual room) and/or function for players to trade their power-up cards with other players. Card trading module 428 may utilize card generation and validation module 424 to validate cards being traded at a trading site.

It should be noted that one or more modules may be combined into one module. Further, there may be one evaluation module where the determined payout does not depend on whether there were any power-up cards utilized, any wild symbols, any scatter symbols, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

Figure 5:
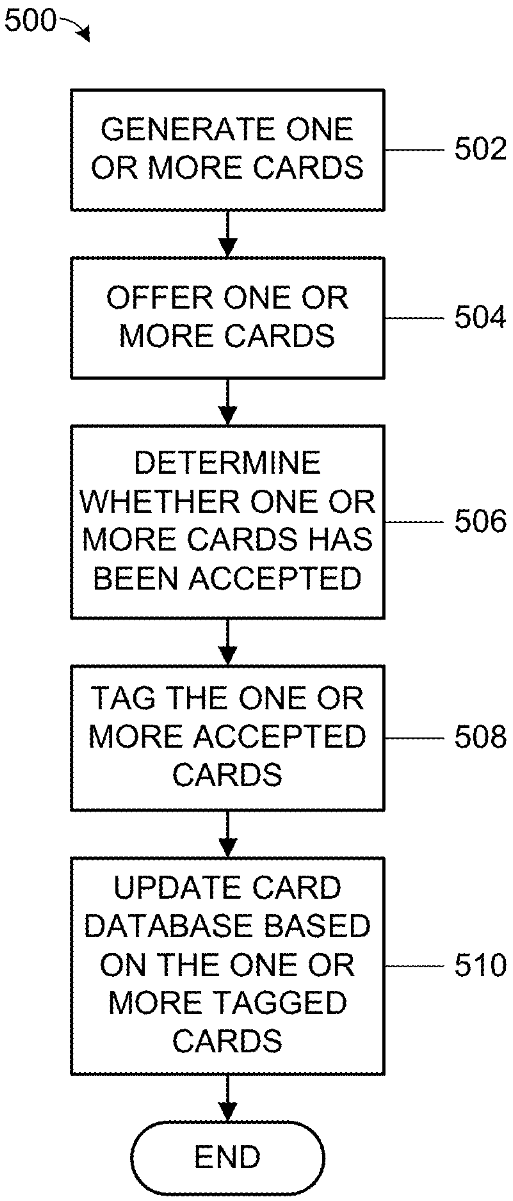
FIG. 5 is a flow diagram for generating and distributing one or more gaming cards, according to one embodiment.

FIG. 5 is a flow diagram for generating and distributing power-up cards, according to one embodiment. The method may include card generation and validation module 424 generating one or more cards (step 502). The method may include offering one or more cards to the player (step 504). The method may include electronic gaming device 100, electronic gaming system 200, and/or any other processing device determining whether one or more cards have been accepted (step 506). The method may include tagging one or more accepted cards (step 508). The method may include the updating of the card database based on the one or more tagged cards (step 510). Once done, the method may end. In one example, the tagging procedure is utilized to validate one or more power-up cards.

In one example, the player may be playing electronic gaming device 100 and/or electronic gaming system 200 within an affiliated casino property where the electronic gaming device displays (e.g., offers) one or more power-up cards (e.g., one or more special skill cards, one or more attack cards, one or more defense cards, etc.) for the player to select from based on a random event. Power-up cards may be earned and/or offered based on performance, randomly, a predetermined pattern, a player level, player card data, and/or in any other distribution method.

In another example, the player may be playing an electronic gaming device, based on earning a predetermined outcome electronic gaming device 100 and/or electronic gaming system 200 may display one or more power-up cards (e.g., Special card type 1, Special card type 2, Attack card type 1, Attack card type 2, Defense card type 1, Defense card type 2, etc.) for the player to select from. For example, three power-up card symbols may be displayed on one or more reels, which may generate one power-up card. In another example, five power-up card symbols may be displayed on one or more reels, which may generate three power-up cards and/or one rare power-up card. In one example, a power-up card may be rare (e.g., limited) because of the functionality of the card (e.g., powerful, special, effectiveness, rubber and glue functionality—reverses an attack back onto the attacker, etc.). In another example, a power-up card may be common (e.g., large supply) because of the functionality of the card (e.g., hit or miss effectiveness, limited power, etc.).

In another example, the player may be shopping at a retail store, which the casino has formed a relationship, where when the player spends a predetermined dollar amount (e.g., $25, $50, $100, etc.) the player will receive one or more power-up cards (e.g., one or more special skill cards, one or more attack cards, one or more defense cards, etc.). In one example, the higher the total spent by the player, the better the one or more power-up cards are valued and/or the more cards are offered.

In another example, the player may be shopping at a retail store, which the casino has formed a relationship, where when the player purchases a specified item (e.g., TV, computer, tablet, etc.) the player will receive one or more power-up cards (e.g., Special card type 1, Special card type 2, Attack card type 1, Attack card type 2, Defense card type 1, Defense card type 2, etc.). In one example, depending on the item purchased changes which power-up cards are offered and/or earned by the player. For example, the purchase of a computer may entail one or more first level power-up cards. Whereas, the purchase of a computer may entail one or more second level power-up cards. In one example, the first level power-up cards may be less valuable then the second level power-up cards.

In another example, the player may eat at a restaurant, which the casino has formed a relationship, where when the player spends a predetermined dollar amount (e.g., $25, $50, $100, etc.) the player will receive one or more power-up cards (e.g., one or more special skill cards, one or more attack cards, one or more defense cards, etc.).

In another example, the player may eat at a restaurant, which the casino has formed a relationship, where when the player purchases a specified item (e.g., an appetizer, special drink, certain entre, etc.) the player will receive a power-up card. As a further example, if you purchase a Big Mac Value Meal at McDonalds you may receive one or more power-up cards (e.g., one or more special skill cards, one or more attack cards, one or more defense cards, etc.).

In another example, the player may do business with any business (e.g., cable company, car repair facility, car dealership, car wash, landscape service, bank, etc.), which the casino has formed a relationship, where when the player makes a purchase and/or completes some other specified activity (e.g., test drives a new car), they receive a power-up card.

In another example, the casino may provide power-up cards based on a player utilizing other facilities at the casino (e.g., booking hotel rooms, using the spa, eating at on-site restaurants, comps for playing table games, etc.).

Receipt of the power-up card could be in the form of a scratch and revel ticket, an actual card (e.g., Baseball type trading card), a ticket with a bar code, an internet website with a redemption code, applied to their player club card, stored in a card bank, stored in a tournament bank, and/or any method for providing cards.

Figure 6:
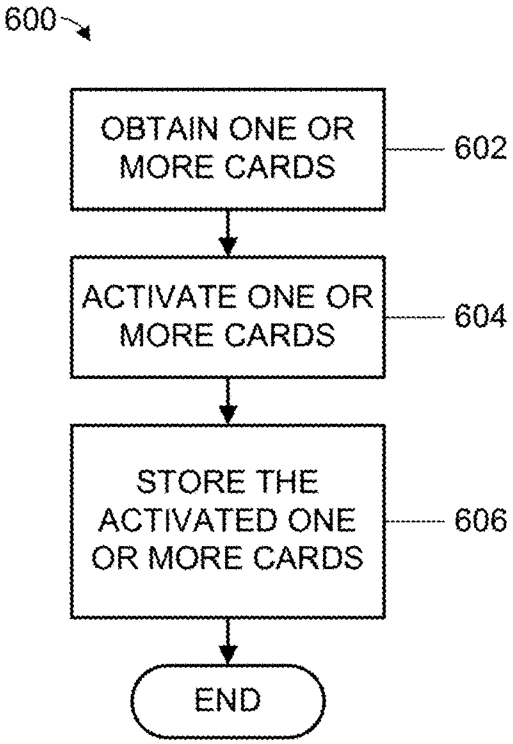
FIG. 6 is a flow diagram for activating one or more power-up gaming cards, according to one embodiment.

FIG. 6 is a flow diagram for activating one or more power-up game cards, according to one embodiment. The method may include obtaining one or more cards (step 602). The method may include the activation of one or more cards (step 604). The method may include the storing of the activated card(s) (step 606). The method may then end.

In one example, the player may obtain a scratch and reveal ticket, which once scratched may reveal multiple cards for the player to select one or more of the power-up cards. To activate one or more power-up cards, the player may enter in a redemption code associated with the power-up card selected by the player via internet, gaming device, and/or any other computing device. In one example, the player may have to login to their account to activate the one or more power-up cards.

In another example, the player may be playing electronic gaming device 100 and/or electronic gaming system 200. Based on earning a predetermined outcome electronic gaming device 100 and/or electronic gaming system 200 may display one or more power-up cards for the player to have the option to select one or more power-up cards from the one or more presented power-up cards. Once the player selects the one or more power-up cards, electronic gaming device 100, electronic gaming system 200, and/or any other processing device may then activate the one or more power-up cards.

In another example, electronic gaming device 100 and/or electronic gaming system 200, based on betting a certain amount, may display power-up cards for the player to select from. Once the player selects the power-up card(s), electronic gaming device 100, electronic gaming system 200, and/or any other processing device may then activate the card.

In another example, the player may obtain one or more power-up cards through one or more trades with one or more different players. Once the player selects a power-up card to trade, electronic gaming device 100, electronic gaming system 200, and/or any other processing device may then remove the traded power-up card from one player's card bank and activate the card in the other player's card bank. The trade may take place via card trading module 428 (see FIG. 4). The trade may be tracked through card tracking module 420 and/or card trading module 428.

In another example, electronic gaming device 100, electronic gaming system 200, and/or any other device may distribute a ticket for the player to take to an activation terminal to activate one or more power-up cards.

In another example, electronic gaming device 100 and/or electronic gaming system 200 may distribute a ticket with a redemption code and a website for activation via the Internet of the one or more power-up cards. Any of these examples may be utilized in combination and/or any other way to activate the card may be used.

Figure 7:
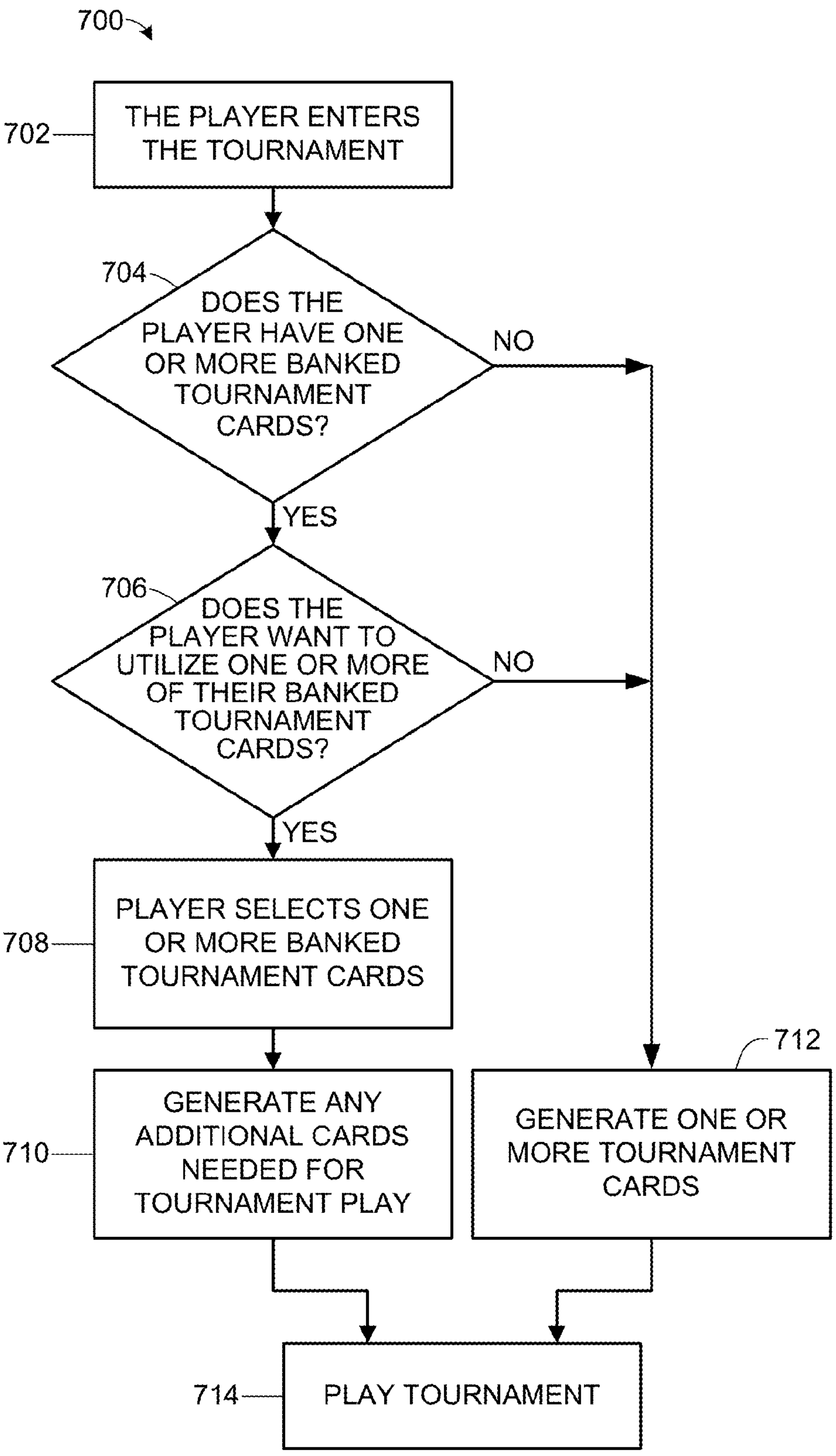
FIG. 7 is a flow diagram of tournament play, according to one embodiment.

FIG. 7 is a flow diagram of tournament play, according to one embodiment. The method may include the player entering the tournament (step 702). The method may include a determination if the player's account has power-up cards banked or not (step 704). If the player has power-up cards, the method may include allowing the player to elect to use banked power-up cards (step 706). If the player has no power-up cards, and/or elects not to use the banked power-up cards, the method may include generating one or more power-up cards for use in the tournament (Step 712). In the event the player elects to use banked power-up cards, the method may include the player selecting one or more banked power-up cards (step 708). The method may include generating additional power-up cards, if needed for tournament play (step 710). Once the player has the necessary power-up cards, the method may include playing in the tournament (step 714).

For example, in the event the tournament allows for the use of up to five power-up cards and a player only has three power-up cards in their bank of cards, then the player may be presented with a list of power-up cards from which they may select two additional power-up cards. In one example, the generated power-up cards may be generated randomly. In another example, the generated power-up cards may be generated in a predetermined pattern. In another example, the generated power-up cards may be generated based on a player level. In this example, a higher ranked player (e.g., gold card holder) may receive better cards than a lower ranked player (e.g., silver card holder). The better cards may be based on an average, be every time, and/or any other distribution method. In another example, if a player has banked cards that are good but decides not to utilize these good power-up cards for this tournament, the generated power-up cards may be below average cards.

In another example, if the player, in the above example, chooses to only utilize one of their banked power-up cards, they may be presented with a list of power-up cards from which they may select four additional power-up cards.

Any number (e.g., 1, 2, 5, 10, etc.) of additional power-up cards may be offered to the player. In one example, at the end of tournament play, any unused power-up cards may be banked. In another example, at the end of tournament play, any unused power-up cards may not be banked. In one example, any unused power-up cards at the end of tournament play may be banked if the player utilized all of their previously banked power-up cards. In another example, any unused rare power-up cards may be banked at the end of tournament play. In another example, only non-rare power-up cards may be banked at the end of tournament play. Any of these examples may be combined and/or reversed. For example, any unused power-up cards may be banked if the player did not utilize all of their previously banked power-up cards.

Figure 8:
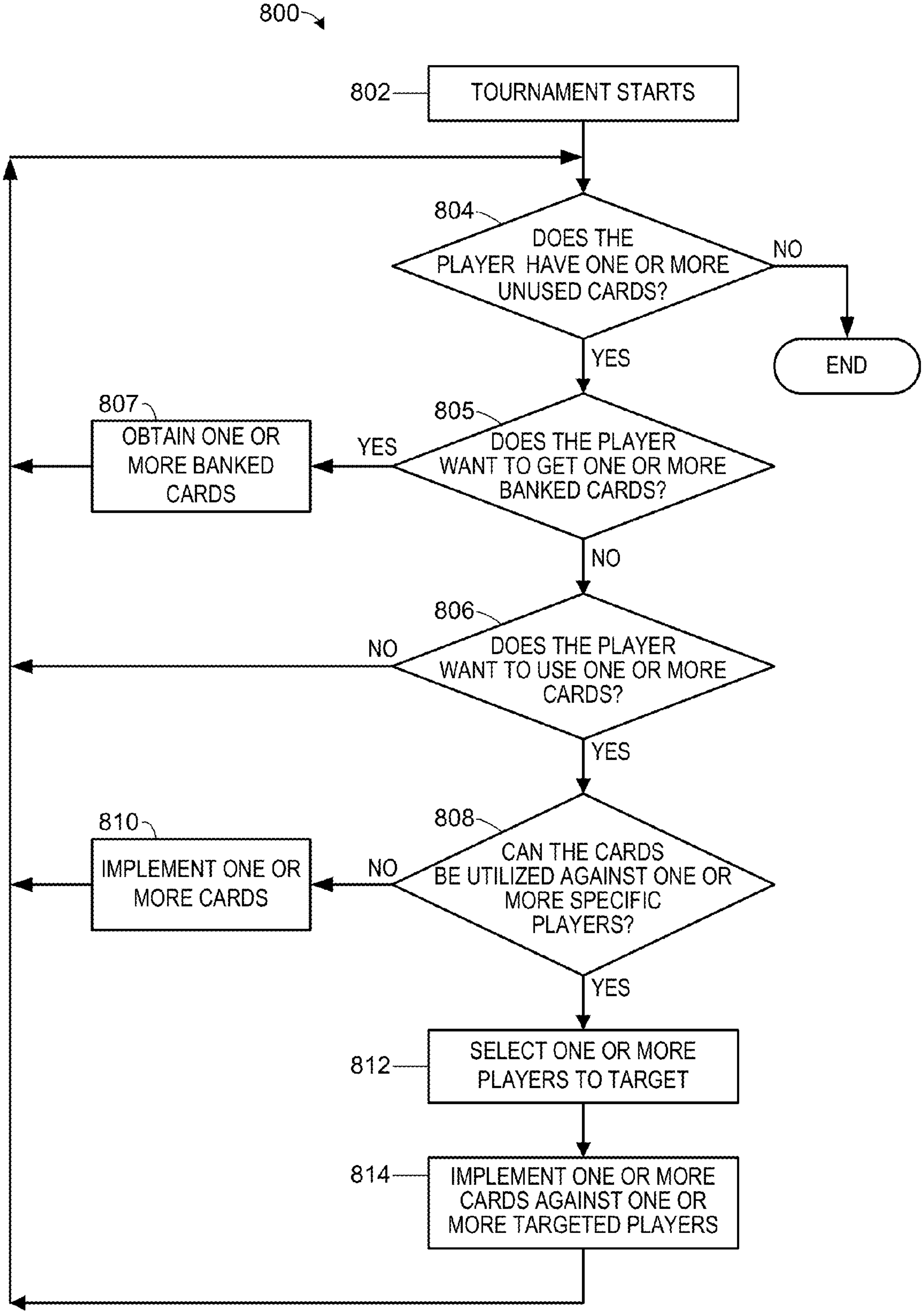
FIG. 8 is another flow diagram of tournament play, according to one embodiment.

FIG. 8 is a flow diagram of tournament play, according to one embodiment. The method may include the tournament starting (step 802). The method may include determining if the player has one or more unused power-up cards (step 804). If the player does not have one or more unused power-up cards, the player may be asked to get one or more power-up cards (step 805). If the player does have available power-up cards, the method may include asking the player if they want to use one or more of their power-up cards (step 806). If the player chooses to use one or more of their power-up cards, the method may include determining if the power-up card can be utilized against one or more specific players (step 808). If the power-up card cannot be used against specific players, it may be applied to all the players (step 810). If the player has a power-up card that can be used against one or more specific players, the player may be asked to select a player or players to target (step 812). The method may then include implementing one or more power-up cards against one or more targeted players (step 814). The game may then return to determining if the player has one or more unused power-up cards (step 804).

For example, if the player does not have one or more unused power-up cards the player may be directed by electronic gaming device 100 and/or electronic gaming system 200, and/or any other source of direction, to where they may obtain power-up cards for use in the tournament. The player may be directed to any source for obtaining power-up cards, such as a bartender, tournament host/hostess, a location within the casino, and/or any other location where a power-up card could be distributed to players. In another example, electronic gaming device 100, electronic gaming system 200, and/or any other device may provide one or more power-up cards.

In another example, when the player does have a power-up card available for use, the tournament structure may allow the player to utilize one or more power-up cards. In one example, the player may elect to use a "steal 10 credits from all players" power-up card. The player would then receive 10 credits from each player who has not utilized a shield power-up card (e.g., credit shield card, total shield card, etc.). Therefore, any player that utilizes a credit shield defensive card (and/or similar card) would not have their credits stolen. In another example, a special power-up card may be a super steal power-up card, which may allow the player utilizing the power-up card to steal an item (e.g., credits, spins, etc.) regardless of whether that player utilizes a credit shield card, a total shield power-up card, and/or any similar power-up card. In another example, a super defense power-up card may stop any power-up card including a super attack power-up card. For example, a super credit steal card would be stopped by a super credit defense card (and/or a super defense card).

In another example, when the player does not have a power-up card available for use, the tournament structure may allow the player to elect a default card which may be a "shield from other player attack" power-up card. The shield from other player attack power-up card would keep the player from losing any item (e.g., credits, spins, etc.) if attacked by another player based on being in a vulnerable position. In another example, one or more tournament leaders (and/or any other player for any other reason (e.g., a penalty)) may have power-up cards frozen (e.g., temporary, for the tournament period, etc.), made inactive, removed, and/or taken away based on their position in the tournament, their activities, their conduct, randomly, and/or on a predetermined pattern.

In another example, the players may be given names. In this example two players, CARMEN and SCOTT are playing against each other. If CARMEN does have a power-up card available for use, CARMEN may elect to use a "stop a specific player from playing next 5-spins" power-up card. Then CARMEN may be asked which player to use the power-up card against (e.g., attack). If CARMEN elected to use it against SCOTT, SCOTT may then receive a notification that he was attacked by a power-up card from CARMEN. CARMEN may receive notification of the success of his attack against SCOTT. In a further example, SCOTT may be notified of the pending attack in advance and given an amount of time (e.g., 1 second, 5 seconds, 10 seconds, etc.) to shield himself. If SCOTT has a shield power-up card available, he may use this in the allotted time. In a further example, SCOTT may have implemented a "shield for next 10 plays" card, which would shield SCOTT from any other players' attack. Both SCOTT and CARMEN may then receive notification of the attack, the shielding, and/or the outcomes. The shield power-up cards may last for any amount of duration (e.g., 1 second, 5 minutes, three player's turns, three players' turns, etc.). In another example, one or more players may be able to see live video streams (and/or any other video representation of the other players—avatar) of the other players.

In another example, the tournament may have teams. For example, rather than the power-up card being used against just one individual, the player may elect to use the "stop a specific player from playing next 5 spins" card, against an entire team. By doing so, the entire team would have to halt play, allowing the team which implemented the power-up card to potentially move ahead.

In another example, rather than the shield power-up card being used to defend just one individual, the player may elect to use the "shield for next 10 plays" card for the benefit of the player's entire team. By doing so, the entire team may be protected from the opposing teams' power-up card attacks. In various example, the defense power-up cards (and/or the attack power-up cards) may be specific type of cards (e.g., defend against credit attack for 5 spins, defend against credit attack for 1 minute, defend against credit attack from one or more specific players for a time period ((e.g., 1 minute, five minutes, the entire tournament, etc.) and/or a turn number (e.g., 1 turn, 3 turns, all turns, etc.)), defend against spin attack for 10 spins, defend against spin attack for 5 minutes, defend against spin attack for next 3 spins and against credit attack for the next 5 minutes). The attack power-up cards may be specific type of cards (e.g., obtain credits and spins for next 5 spins, obtain credits for 1 minute from one or more players, obtain credits and multipliers from one or more specific players for a time period (e.g., 1 minute, five minutes, the entire tournament, etc.) and/or a turn number (e.g., 1 turn, 3 turns, all turns, etc.), obtain spins, credits, and multiplier for the next 10 spins, obtain spins for 5 minutes, obtain spins for the next 3 spins and credits for the next 5 minutes).

Figure 9A:
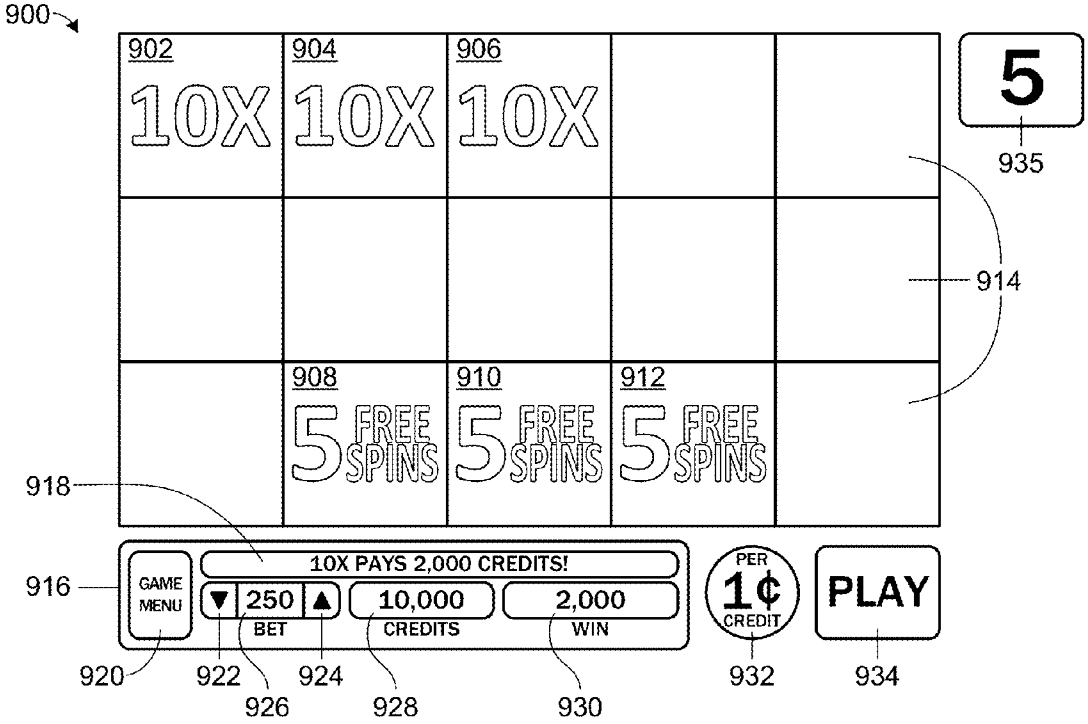
FIG. 9A is an illustration of tournament game play, according to one embodiment.

FIG. 9A is another illustration of tournament game play, according to one embodiment. A first screen image 900 may include a first image 902, a second image 904, a third image 906, a fourth image 908, a fifth image 910, a sixth image 912, a payline display area 914, a game data area 916, a game communication area 918, a game menu button 920, a bet reducer button 922, a bet increaser button 924, a bet amount image 926, a credit amount image 928, a win amount area 930, a credit value image 932, and a play button 934.

First screen image 900 may include a predetermined number of columns and a predetermined number of rows. First screen image 900 may include any number of rows and/or any number of columns. For example, first screen image 900 may have five rows and ten columns; first screen image 900 may have eight rows and thirteen columns, and/or any other combinations of rows and columns. The player may initiate a wagering event through input device 316. Images in each cell may scroll up and/or down and/or side-to-side. Positioning of the images displayed in the reels on first screen image 900 may display the outcome of a wagering event (e.g., a win or a loss for the player).

For example, it may be that if all columns in a first row have the same image (e.g., cherries, bars, pictures of the player as captured by camera 312, etc.) then a winning event has occurred. Lining up of the images may happen in many ways. For example, if all images in the various cells, which are touching by a shared side or by a corner, have the same image, this may represent that a winning event has occurred. If all of the images in a single row have the same image, this may represent a winning event. If all of the images in a single column have the same image, this may represent a winning event. If all of the images on a diagonal column have the same image, this may represent a winning event. The diagonal column could include any number of cells (e.g., 1, 2, 4, etc.).

First image 902, second image 904, third image 906, fourth image 908, fifth image 910, and sixth image 912 may be any image (e.g., card, letter, bar, cherry, blank, etc.). On first screen image 900, first image 902, second image 904, and third image 906 are shown as "10×", which according to game communication area 918, represent a win of 2,000 credits (e.g., 200 credits×10× multiplier). On first screen image 900, fourth image 908, fifth image 910, and sixth image 912 are show as a win of "5 Free Spins".

Game data area 916 may include additional data relating to the game. For example, game data area may include game communication area 918, game menu button 920, bet reducer button 922, bet increaser button 924, bet amount image 926, credit amount image 928, and win amount area 930, and/or any other information.

Game communication area 918 may display message(s) to the player. In first screen image 900, the message states, "10× PAYS 2,000 CREDITS!". Game communication area 918 may display any message.

Game menu button 920 may include data relating to the game. For example, the payout structures, payout odds, the amount won over a predetermined number of game plays, the amount won over a specific time frame, and/or any other game play data may be accessed via game menu button 920. In another example, game menu button 920 may access instructions on how to play the game, access to other games, and/or access to other versions of the same game.

Bet reducer button 922 may decrease the amount of credits wagered on game play. Bet increaser button 924 may increase the amount of credits wagered on game play. Bet amount image 926 may show the amount of credits wagered on game play. Credit amount image 928 may show the amount of credits available to the player for game play. Win amount area 930 may show the payout amount of the last event. Credit value image 932 may show the value of a single credit. Play button 934 may start the next game. A banked free spins area 935 may show the amount of banked spins. The banked free spins may be utilized at end time including at the end of regulation tournament play.

Figure 9B:
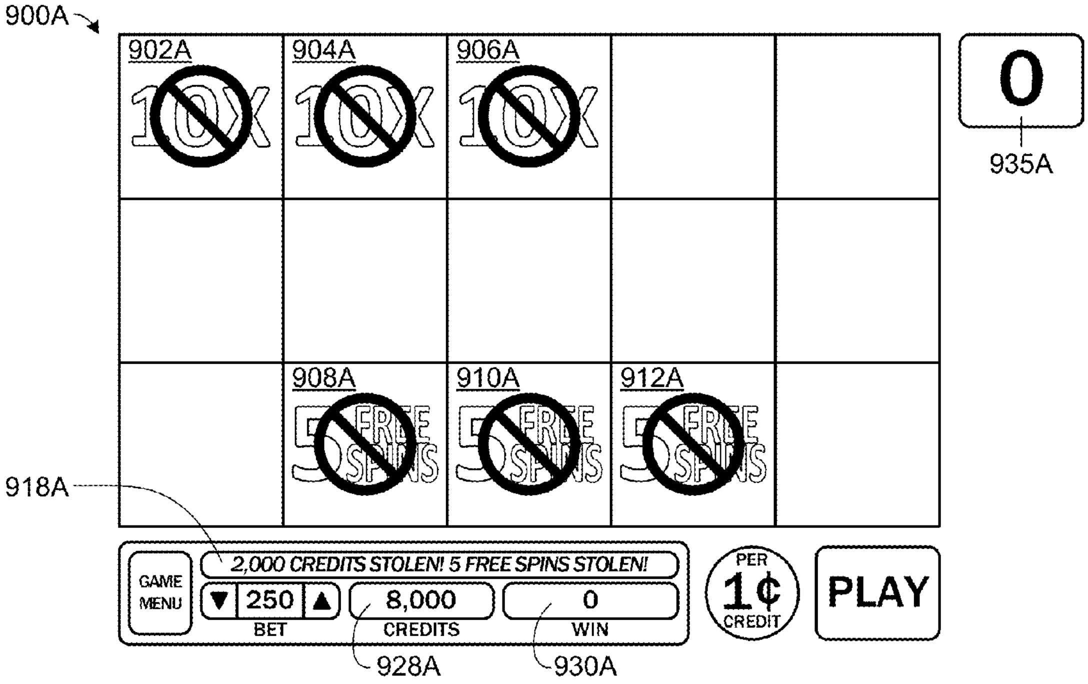
FIG. 9B is another illustration of tournament game play, according to one embodiment.

FIG. 9B is another illustration of tournament game play, according to one embodiment. FIG. 9B shows a second screen image 900A for electronic gaming device 100 and/or electronic gaming device 200 on display 318. Second screen image 900A may include a first modified image 902A, a second modified image 904A, a third modified image 906A, a fourth modified image 908A, a fifth modified image 910A, a sixth modified image 912A, a modified game communication area 918A, a modified credit amount image 928A, and a modified win amount area 930A.

First modified image 902A may be a modification of first image 902, second modified image 904A may be a modification of second image 904, third modified image 906A may be a modification of third image 906, fourth modified image 908A may be a modification of fourth image 908, fifth modified image 910A may be a modification of fifth image 910, and sixth modified image 912A may be a modification of sixth image 912 as a result of the use of a power-up card. Modified game communication area 918A may tell the player in words what the modified images are displaying graphically (e.g., "2,000 Credits Stolen! 5 Free Spins Stolen!") as a result of the use of a power-up card. Modified credit amount image 928A may show the adjusted amount of credits after the use of a power-up card. Modified win amount area 930A may show the adjusted amount of win after the use of a power-up card. A modified banked free spins 935A may show a balance of zero based on 5 free spins being stolen (e.g., 5−5=0). Each modified image may show the effects of one or more power-up cards on the player's results.

In one example, a first player (e.g., "CARMEN") may use a "steal all wins" power-up card to steal any wins which a second player (e.g., "SCOTT") may earn on the next spin. First screen image 900 may represent the next spin for SCOTT, with a win of 2,000 credits (e.g., "10×") and the win of five free spins (e.g., "5 Free Spins"). Second screen image 900A may then represent the results of CARMEN's attack on SCOTT. First modified image 902A, second modified image 904A, third modified image 906A, fourth modified image 908A, fifth modified image 910A, and sixth modified image 912A may be showing SCOTT the theft of his win (and/or "the amount he won that will now go to CARMEN"). Game communication area 918A may then tell SCOTT in words what has occurred, "2,000 Credits Stolen! 5 Free Spins Stolen!", and/or any other words. Modified credit amount image 928A may show the reduction in number of credits based on the power-up card (e.g., In this example, the player had 10,000, lost 2,000, and now has 8,000). Modified win amount area 930A may show the change in the win of the last spin based on the effects of the power-up card (e.g., 0 vs. 2,000). It should be noted that in these examples, the first player may be one or more players and the second player may be one or more players.

Figure 10A:
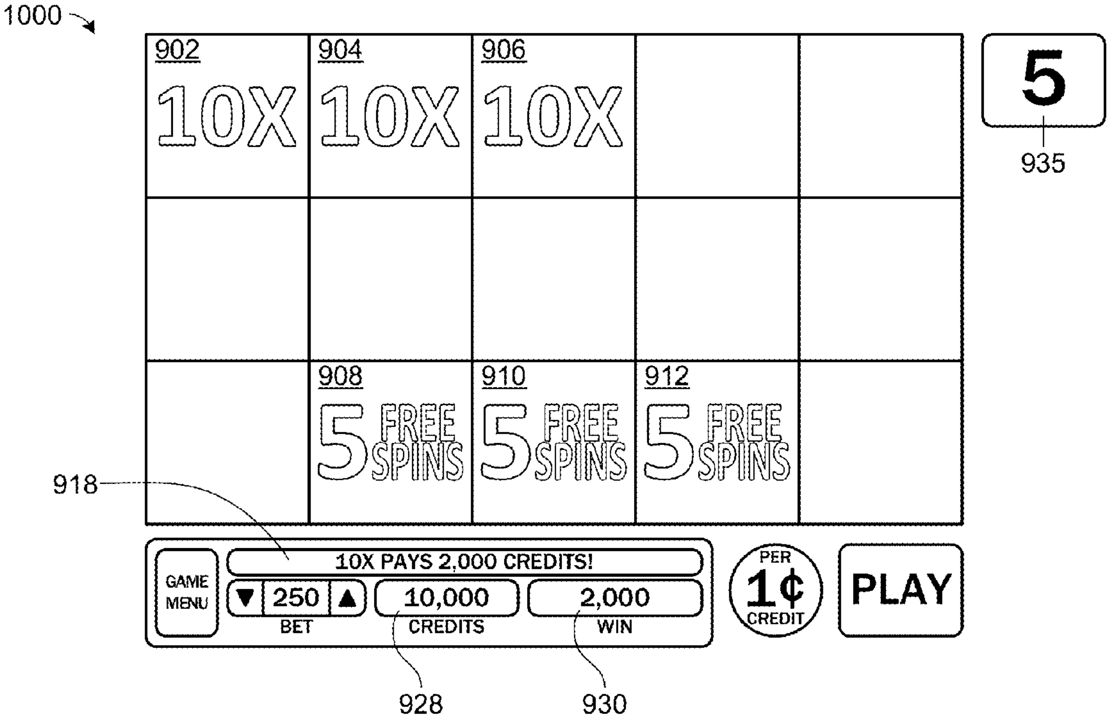
FIG. 10A is another illustration of tournament game play, according to one embodiment.

FIG. 10A is an illustration of tournament game play, according to one embodiment. FIG. 10A may show a third screen image 1000 for electronic gaming device 100 and/or electronic gaming system 200 on display 318. Third screen image 1000 may include first image 902, second image 904, third image 906, fourth image 908, fifth image 910, sixth image 912, game communication area 918, credit amount image 928, and win amount area 930.

First image 902, second image 904, third image 906, fourth image 908, fifth image 910, and sixth image 912 may be any image (e.g., card, letter, bar, cherry, blank, etc.). In this example, on third screen image 1000, first image 902, second image 904, and third image 906 are shown as "10×", which according to game communication area 918 represent a win of 2,000 credits. Game communication area 918 may say, "10× pays 2,000 credits," and/or any other words. In this example, on third screen image 1000, fourth image 908, fifth image 910, and sixth image 912 are show as a win of "5 Free Spins". Credit amount image 928 may show the amount of credits available to the player for game play. Win amount area 930 may show the payout amount of the last event. All of the cells may show any image.

Figure 10B:
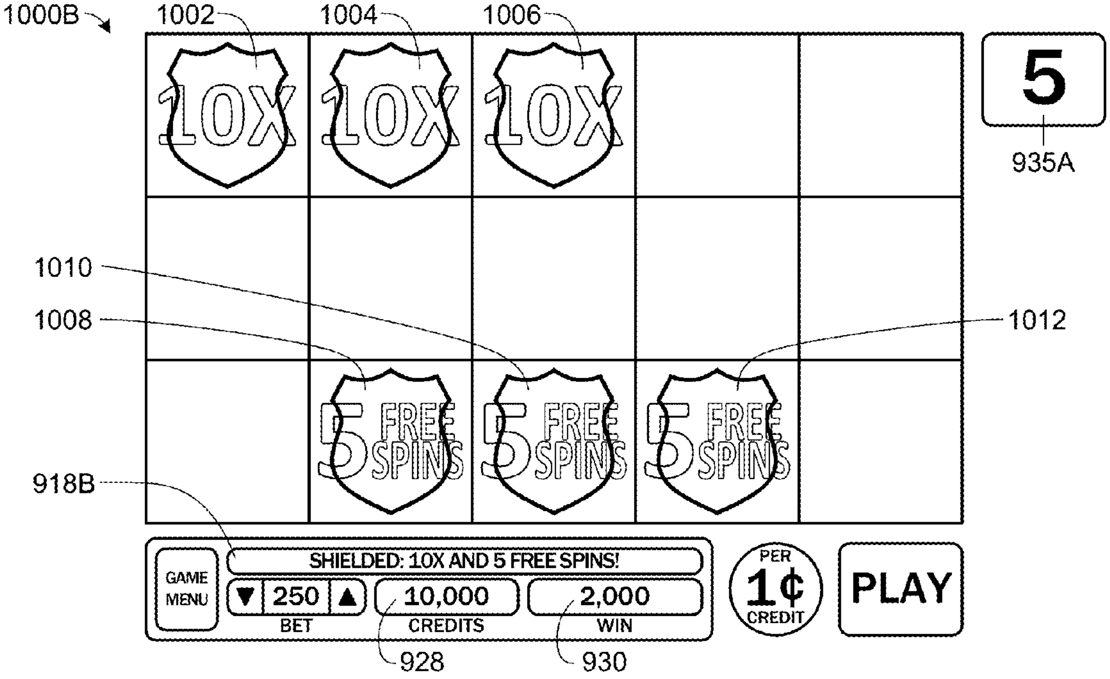
FIG. 10B is another illustration of tournament game play, according to one embodiment.

FIG. 10B is an illustration of tournament game play, according to one embodiment. FIG. 10B may show a fourth screen image 1000B for electronic gaming device 100 and/or electronic gaming system 200 on display 318. Fourth screen image 1000B may include a first shielded image 1002, a second shielded image 1004, a third shielded image 1006, a fourth shielded image 1008, a fifth shielded image 1010, a sixth shielded image 1012, a game communication area 918A, a credit amount image 928A, and a win amount area 930A.

First shielded image 1002 may be a modification of first image 902 on third screen image 1000, second shielded image 1004 may be a modification of second image 904 on third screen image 1000, third shielded image 1006 may be a modification of third image 906 on third screen image 1000, fourth shielded image 1008 may be a modification of fourth image 908 on third screen image 1000, fifth shielded image 1010 may be a modification of fifth image 910 on third screen image 1000, and sixth shielded image 1012 may be a modification of sixth image 912 on third screen image 1000, as a result of the use of a power-up card. Modified game communication area 918A may tell the player in words what the modified images are displaying graphically (e.g., "Shielded: 10× and 5 Free Spins!") as a result of the use of a power-up card. Modified credit amount image 928A may show the adjusted amount of credits after the effect of the use of a power-up card. Modified win amount area 930A may show the adjusted amount of win after the effect of the use of a power-up card. Each modified image may show the effects of a power-up card for the player.

In one example, player "CARMEN" may use a "steal all wins" power-up card to steal any wins which "SCOTT" earns on the next spin. Third screen image 1000 may represent the next spin for SCOTT, with a win of 2,000 credits (e.g., "10×") and the win of five free spins (e.g., "5 Free Spins"). In this example, SCOTT played a "shield" power-up card, enabling him to protect himself from the attack of CARMEN. Fourth screen image 1000B may then represent the results of CARMEN's attack on SCOTT, as shielded. First shielded image 1002, second shielded image 1004, third shielded image 1006, fourth shielded image 1008, fifth shielded image 1010, and sixth shielded image 1012 may be showing SCOTT shielding the theft of his wins. Game communication area 9188 may then tell SCOTT in words what occurred, "Shielded: 10× and 5 Free Spins". Modified credit amount image 928B may show the protection in number of credits based on the shield power-up card (e.g., SCOTT had 10,000, and with the shield protection, he lost no points, leaving him with 10,000). Modified win amount area 930B may show that there was no change in the win of the last spin based on the effects of the power-up card (e.g., stays 2,000). In another example, if SCOTT utilized a credit shield power-up card, then SCOTT would have saved the credits but lost the 5 free spins. In another example, if SCOTT utilized a spin shield power-up card, then SCOTT would have saved the 5 free spins, but would have lost the credits. In another example, if SCOTT utilized a multiplier shield power-up card, then SCOTT would have lost both the credits and the spins.

In another example, SCOTT may utilize a "rubber and glue" defense card, which may actually cause the attack to be reversed and used against CARMEN. The "rubber and glue" defense card in this example would give SCOTT the benefit of stealing any wins CARMEN may have had.

Figure 11A:
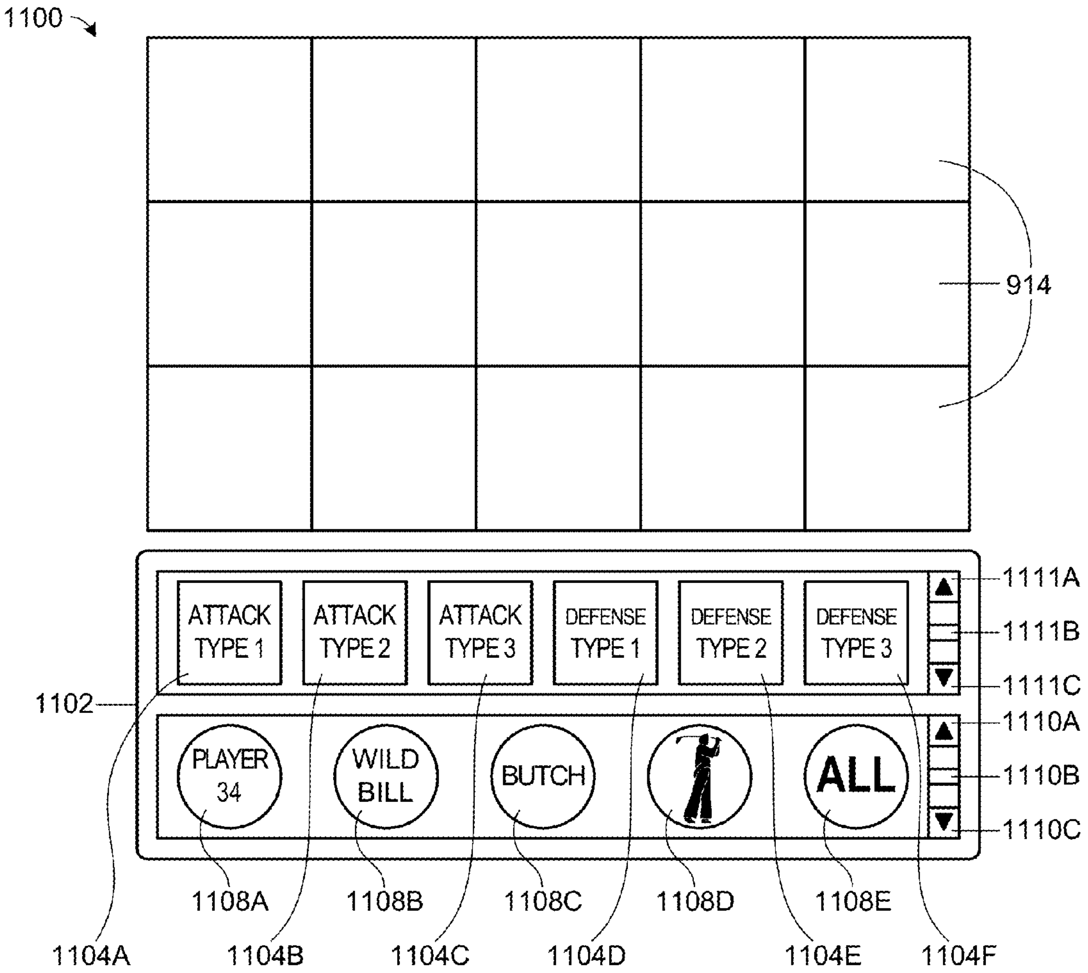
FIG. 11A is another illustration of tournament game play, according to one embodiment.

FIG. 11A is an illustration of tournament game play, according to one embodiment. FIG. 11A may show a screen image 1100 for electronic gaming device 100 and/or electronic gaming system 200 on display 318. Screen image 1100 may include a power-up card selection area 1102, a first power-up card selection 1104A, a second power-up card selection 1104B, a third power-up card selection 1104C, a fourth power-up card selection 1104D, a fifth power-up card selection 1104E, a sixth power-up card selection 1104F, a first player selection 1108A, a second player selection 1108B, a third player selection 1108C, a fourth player selection 1108D, a fifth player selection 1108E, a player selection scroll up button 1110A, a player selection scroll bar 11108, a player selection scroll down button 1110C, a power-up card selection scroll up button 1111A, a power-up card selection scroll bar 1111B, a power-up card selection scroll down button 1111C, and a payline display area 914.

Power-up card area 1102 may include information necessary for the use of power-up cards in game play. Power-up card area 1102 may include a list of players currently playing. Power-up card area 1102 may include the ability to select from the list of players currently playing. For example, first player selection 1108A, second player selection 1108B, third player selection 1108C, fourth player selection 1108D, and fifth player selection 1108E may be those players currently playing at another electronic game device 100 and/or electronic gaming system 200, which may be selected for use of power-up cards.

Power-up card area 1102 may include a list of power-up cards available for use. For example, first power-up card selection 1104A, second power-up card selection 1104B, third power-up card selection 1104C, fourth power-up card selection 1104D, fifth power-up card selection 1104E, and sixth power-up card selection 1104F may be those power-up cards which are available for the player and which now may be selected for implementation. In another example, power-up card selection scroll up button 1110A, power-up card selection scroll bar 1110B, and power-up card selection scroll down button 1110C may be utilized to access other power-up cards (e.g., attack type 4, attack type 5, special skill card 1, special skill card 2, defense type 4, defense type 5, another attack type 1, another defense type 1, etc.).

Figure 11B:
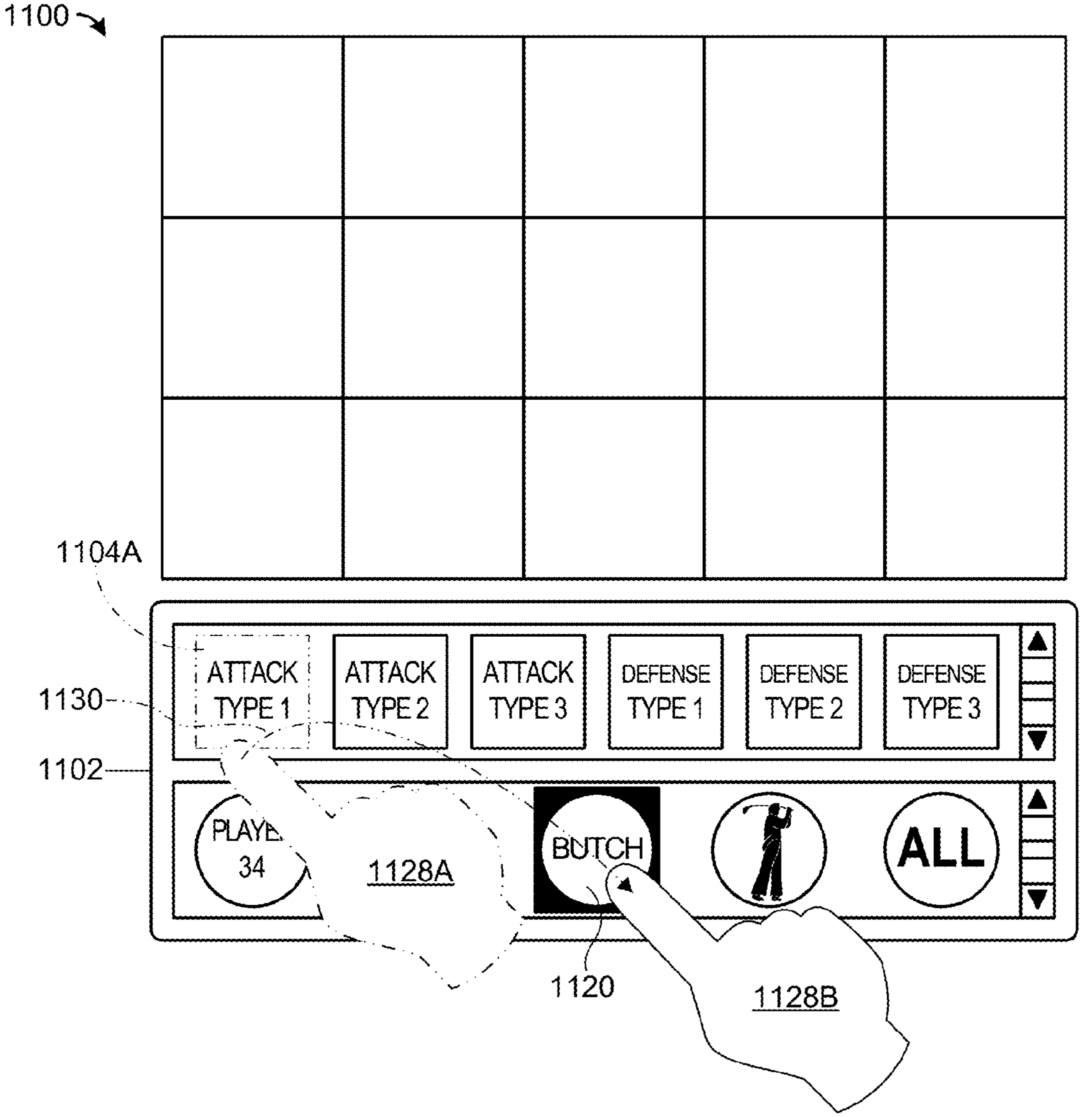
FIG. 11B is another illustration of tournament game play, according to one embodiment.

FIG. 11B is an illustration of tournament game play, according to one embodiment. FIG. 11B may show a screen image 1100A for electronic gaming device 100 and/or electronic gaming system 200 on display 318. Screen image 1100A may include power-up card area 1102, first power-up card selection 1104A, second power-up card selection 1104B, third power-up card selection 1104C, fourth power-up card selection 1104D, fifth power-up card selection 1104E, sixth power-up card selection 1104F, a player selection 1120, a power-up card selection input 1128A, and a player selection input 1128B.

In this embodiment, first power-up card selection 1104A may be selected using power-up card selection input 1128A. Second power-up card selection 1104B may be selected using power-up card selection input 1128A. Third power-up card selection 1104C may be selected using power-up card selection input 1128A. Fourth power-up card selection 1104D may be selected using power-up card selection input 1128A. Fifth power-up card selection 1104E may be selected using power-up card selection input 1128A. Sixth power-up card selection 1104F may be selected using power-up card selection input 1128A. Additionally in this embodiment, player selection 1120 may be selected using player selection input 1128B. The player may utilize any input device (e.g., touch screen, joystick, etc.).

For example, for first power-up card selection 1104A, the player using power-up card selection input 1128A may be select, "Steal Wins Next 5 Spins". The player may then select a target player 1120 ("Butch"), for use of first power-up card selection 1104A by using player selection input 1128B. In one example, by moving power-up card selection input 1128A over first power-up card selection 1104C implements one or more power-up cards. In the event the targeted player wins anything during the next five spins, first power-up card selection 1104A will take the winnings and apply them to the player who implemented first power-up card 1104A. However, if the correct defensive power-up card is utilized, then the attack power-up card would be stopped.

In another example, for second power-up card selection 1104B, the player using power-up card selection input 1128A may select, "Freeze Play 10 Spins". The player may then select target player 1120 ("Butch"), for use of second power-up card selection 1104B by using player selection input 1128B. The targeted player may then be frozen out for 10 spins. In one example, the freezing of the spins may be represented by electronic gaming device 100 and/or electronic gaming system 200 reducing credits available for wagering by an amount of credits representing 10 spins (e.g., 10 credits at 1 credit per spin, 20 credits at 2 credits per spin, etc.). The freezing of the spins may be represented by electronic gaming device 100 and/or electronic gaming system 200 halting the player's ability to play for an amount of time equal to 10 spins (e.g., 1 second per spin, 5 seconds per spin, etc.). The freezing of the spins may be represented by any negative impact to the player.

In another example, for third power-up card selection 1104C, the player using power-up card selection input 1128A may select, "Block Wins Next 5 Spins". The player may then select target player 1120 ("Butch"), for use of third power-up card selection 1104C, by using player selection input 1128B. In the event the targeted player wins anything during the next five spins, third power-up card selection 1104C will take the winnings and/or eliminates the winnings.

In another example, for fourth power-up card selection 1104D the player using power-up card selection input 1128A may select 1104D, "Shield Self from Credit Attack". The player may then select target player 1120 ("Butch"), for use of fourth power-up card selection 1104D, by using player selection input 1128B. In the event the targeted player tries to credit attack the player who implemented fourth power-up card selection 1104D, the credit attack will have no effect on the player for some amount of time (e.g., 1 minute, 5 minutes, 10 minutes, etc.). This power-up shield may work for a number of spins, an amount of time, and/or any other method of tracking usage. This power-up shield may work to protect the player from specific players, from multiple selected players, from some sub-set of players (e.g., opposing team), and/or from all players.

Figure 11C:
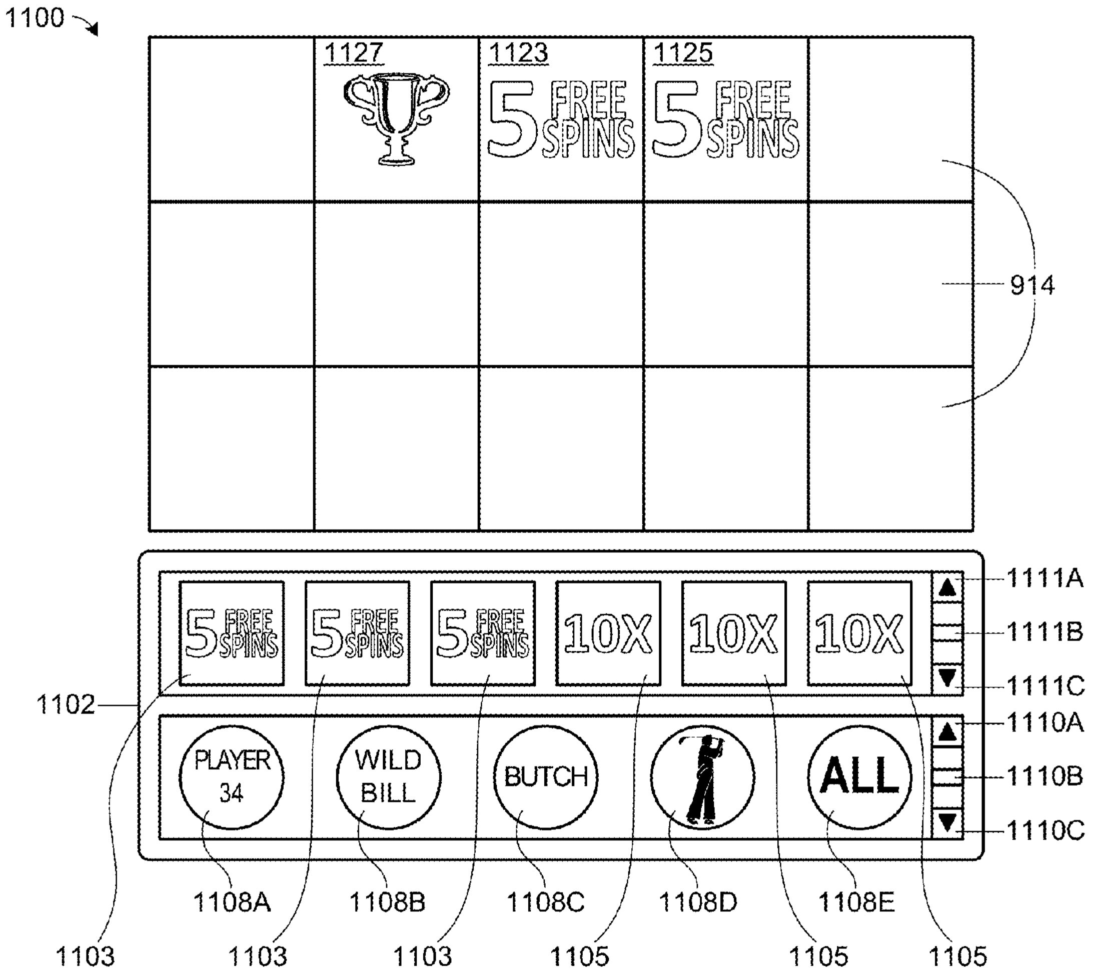
FIG. 11C is another illustration of tournament game play, according to one embodiment.
Figure 11D:
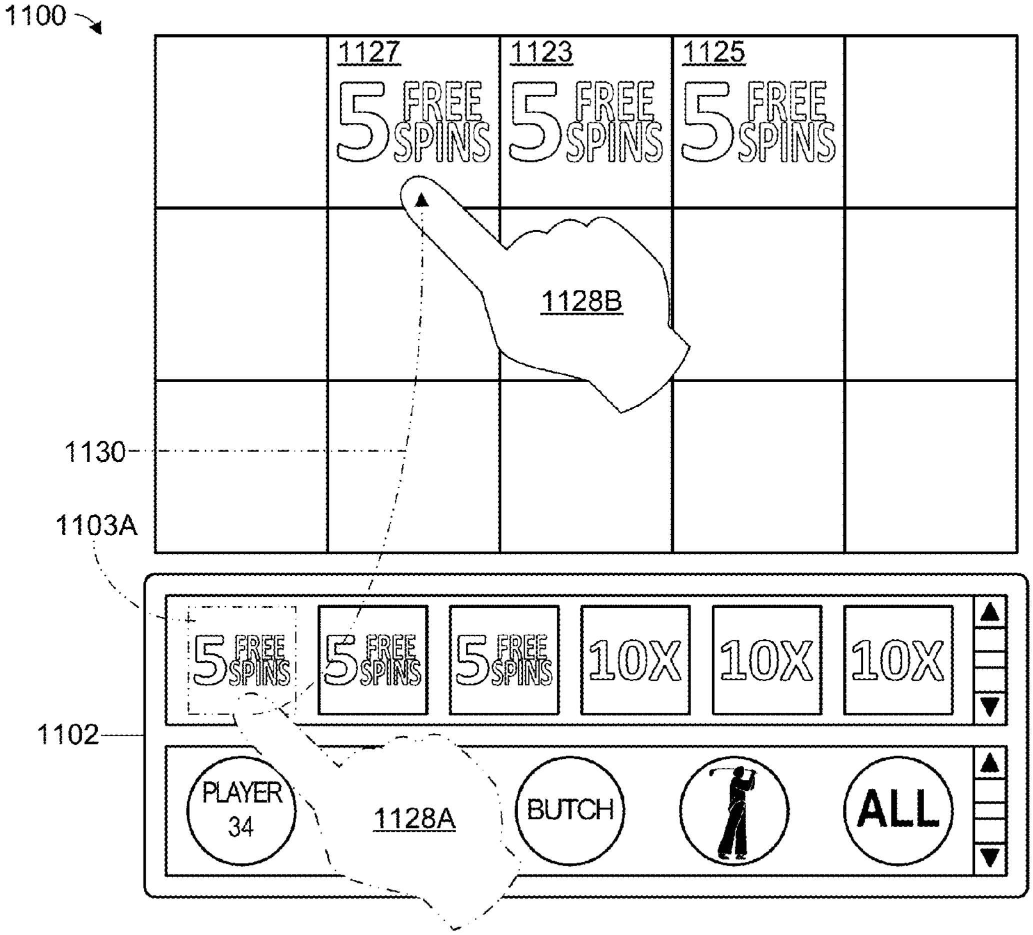
FIG. 11D is another illustration of tournament game play, according to one embodiment.
Figure 11E:
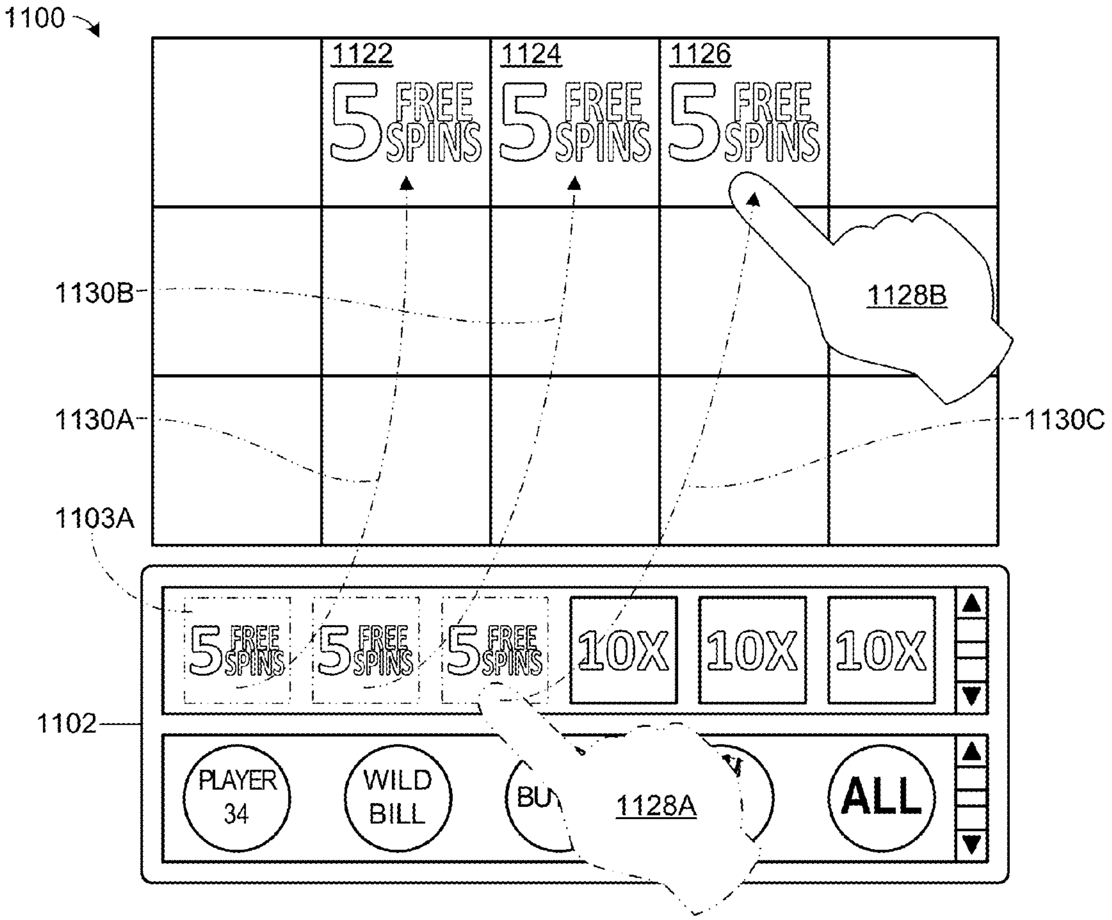
FIG. 11E is another illustration of tournament game play, according to one embodiment.
Figure 11F:
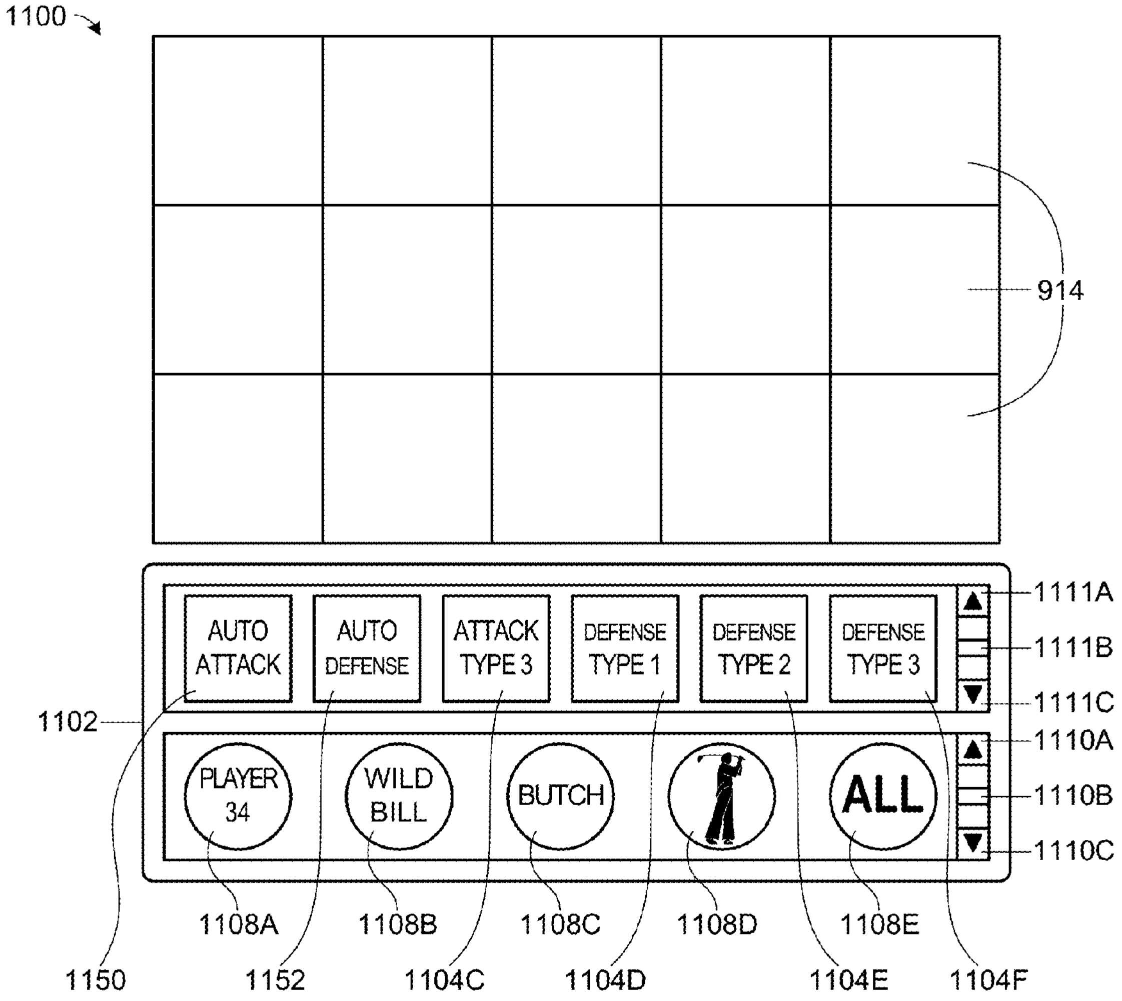
FIG. 11F is another illustration of tournament game play, according to one embodiment.

FIG. 11C is another illustration of power-up game play, according to one embodiment. Screen image 1100 may include a first non-winning symbol 1127, a first 5 free spins symbol 1123, a second 5 free spins symbol 1125, one or more first replacement symbols 1103, and one or more second replacement symbols 1105. There may be any number (e.g., 1-N) of symbols and/or replacement symbols. In this example, there is no winning outcome because only two 5 free spins symbols (e.g., first 5 free spins symbol 1123 and second 5 free spins symbol 1125 landed on plurality of reels 914) were shown when the gaming structure required three 5 free spins symbols to be displayed for a winning outcome. In one example, the player via power-up card selection input 1128A may select (e.g., 1130, 1103A, 1128A, and/or 1128B) one or more of the one or more first replacement symbols 1103 to replace first non-winning symbol 1127 with a 5 free spins symbol to complete a winning outcome (see FIG. 11D). In another example, one or more second replacement symbols 1105 may be utilized to create a multiplier winning outcome. Further, any symbol, such as, credit symbols, free spin symbols, scatter symbols, wild symbols, multiplier symbols, and/or any other symbols may be utilized to complete a winning combination. In another example, one, a few, a plurality, and/or all of the replacement symbols may be utilized at the same time to create a winning combination. In one example, all of first replacement symbols 1103 are selected (e.g., 1103A, 1130A, 11308, 1130C, 1128A, and/or 1128B) to replace a first symbol area 1122, a second symbol area 1124, and a third symbol area 1126 (see FIG. 11E). In another example, an auto attack 1150 and/or an auto defense 1152 may be utilized (see FIG. 11F). For example, auto attack 1150 may be utilized to automatically use one or more selected (e.g., randomly, predetermined pattern, pre-selected pattern, pre-selected card formation, etc.) cards against one or more selected (e.g., randomly, predetermined pattern, pre-selected players, pre-selected pattern, etc.) players. This may occur at random intervals during game play. This may occur on a predetermined pattern and/or a player selected pattern. In another example, auto defense 1152 may be utilized to automatically use one or more selected (e.g., randomly, predetermined pattern, pre-selected pattern, pre-selected card formation, etc.) cards against one or more determined and/or anticipated attacks. In this example, auto defense 1152 may utilize the best card to defend against a specific attack automatically.

Figure 12A:
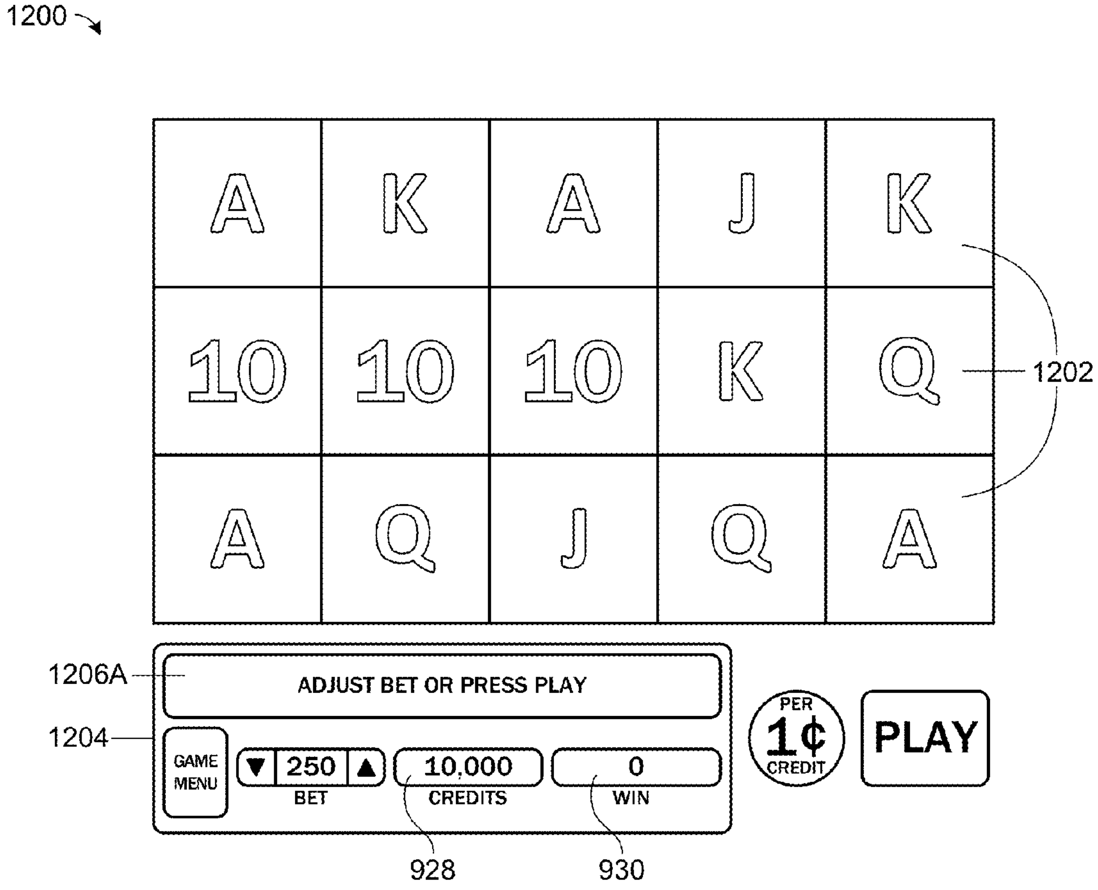
FIG. 12A is another illustration of tournament game play, according to one embodiment.

FIG. 12A is an illustration of tournament game play, according to one embodiment. FIG. 12A may show a screen image 1200 for electronic gaming device 100 and/or electronic gaming system 200 on display 318. Screen image 1200 may include one or more paylines 1202, a game data area 1204, a game communication area 1206A, credit amount image 928, and win amount area 930.

Payline 1202 may display the outcome of the wagering event. Game data area 1204 may include additional data relating to the game. For example, game data area 1204 may include game communication area 1206A, game menu button, bet reducer button, bet increaser button, bet amount image, credit amount image 928, and win amount area 930, and/or any combination thereof.

Game communication area 1206A may display message(s) to the player. In FIG. 12A, game communication area 1206A states, "ADJUST BET OR PRESS PLAY". Game communication area 1206A may display this and/or any message.

Figure 12B:
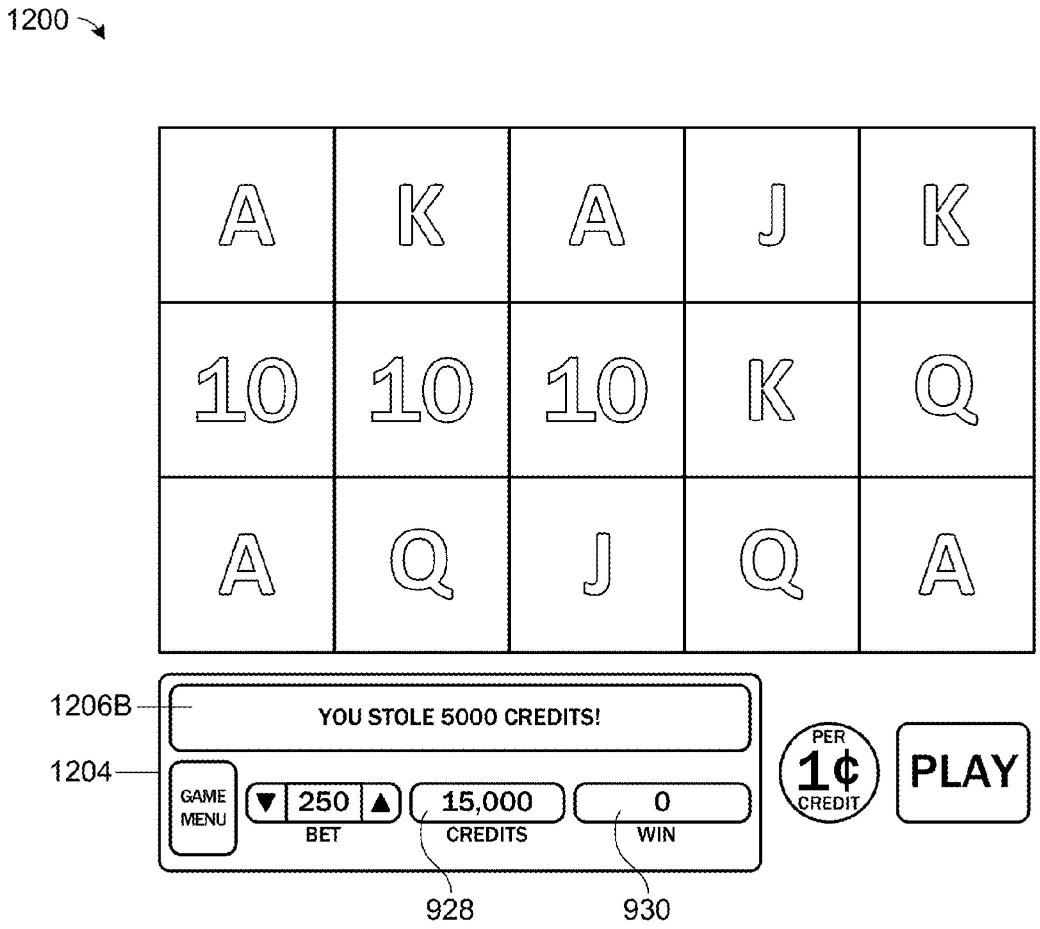
FIG. 12B is another illustration of tournament game play, according to one embodiment.

FIG. 12B is an illustration of tournament game play, according to one embodiment. FIG. 12B may show screen image 1200 for electronic gaming device 100 and/or electronic gaming device 200 on display 318. Screen image 1200 may include game data area 1204, a modified game communication area 1206B, credit amount image 928, and win amount area 930.

Modified game communication area 1206B may display a message to the player. In FIG. 12B, modified game communication area 1206B states, "YOU STOLE 5000 CREDITS". Modified game communication area 1206B may display this and/or any message.

For example, modified game communication area 1206B may display the outcome of a power-up card being played to attack another player. On screen image 1200, the message on 1206B is telling the player that their power-up card was successful in stealing 5,000 credits from another player in the tournament. Credit amount image 928 has been modified to show 15,000 credits now available, which is different than 10,000 credits shown in FIG. 12A.

Figure 12C:
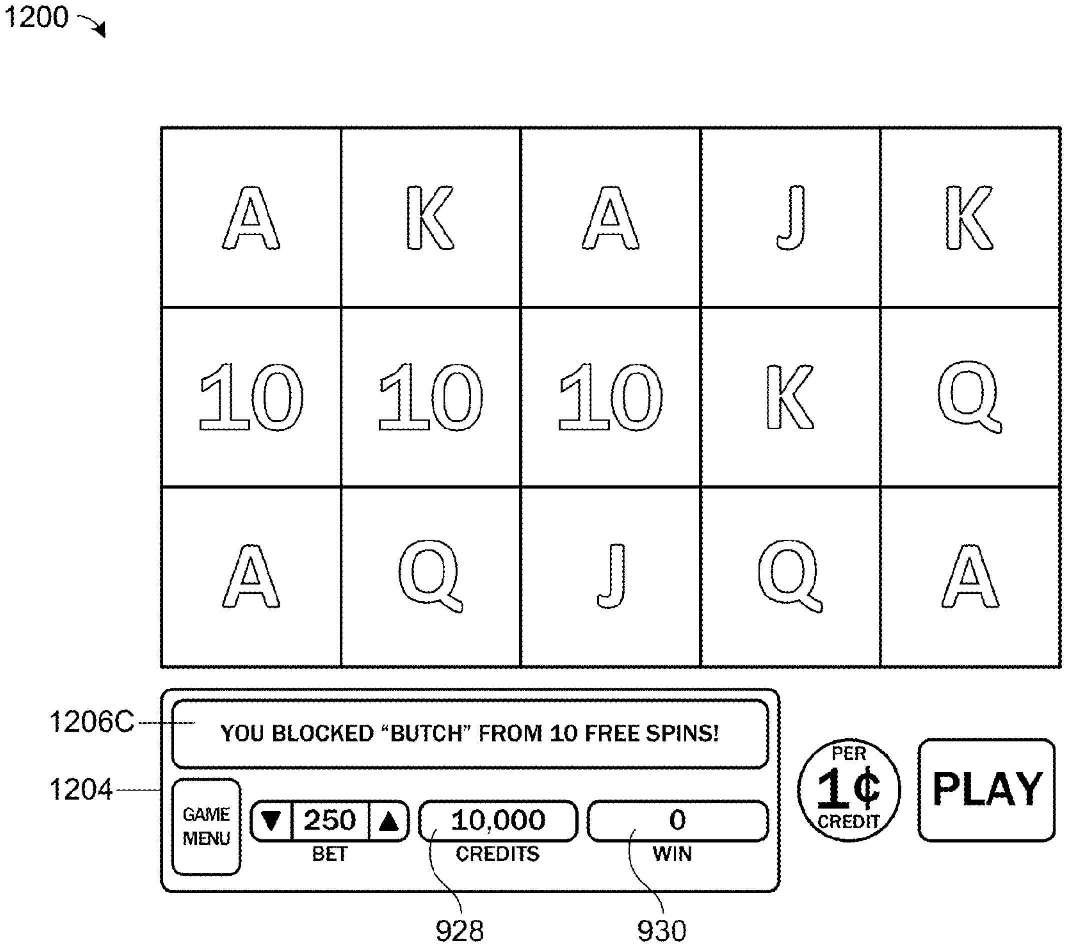
FIG. 12C is another illustration of tournament game play, according to one embodiment.

FIG. 12C is an illustration of tournament game play, according to one embodiment. FIG. 12C shows a screen image 1200 for electronic gaming device 100 and/or electronic gaming device 200 on display 318. Screen image 1200 may include game data area 1204, a modified game communication area 1206C, credit amount image 928, and win amount area 930.

Modified game communication area 1206C may display message(s) to the player. In FIG. 12C, modified game communication area 1206C states, "YOU BLOCKED "BUTCH" FROM 10 FREE SPINS". Modified game communication area 1206C may display this and/or any message.

For example, modified game communication area 1206C may display the outcome of a power-up card being played to attack another player. In FIG. 12C, the message on modified game communication area 1206C is telling the player that their power-up card was successful in blocking Butch from winning 10 free spins in the tournament.

Figure 12D:
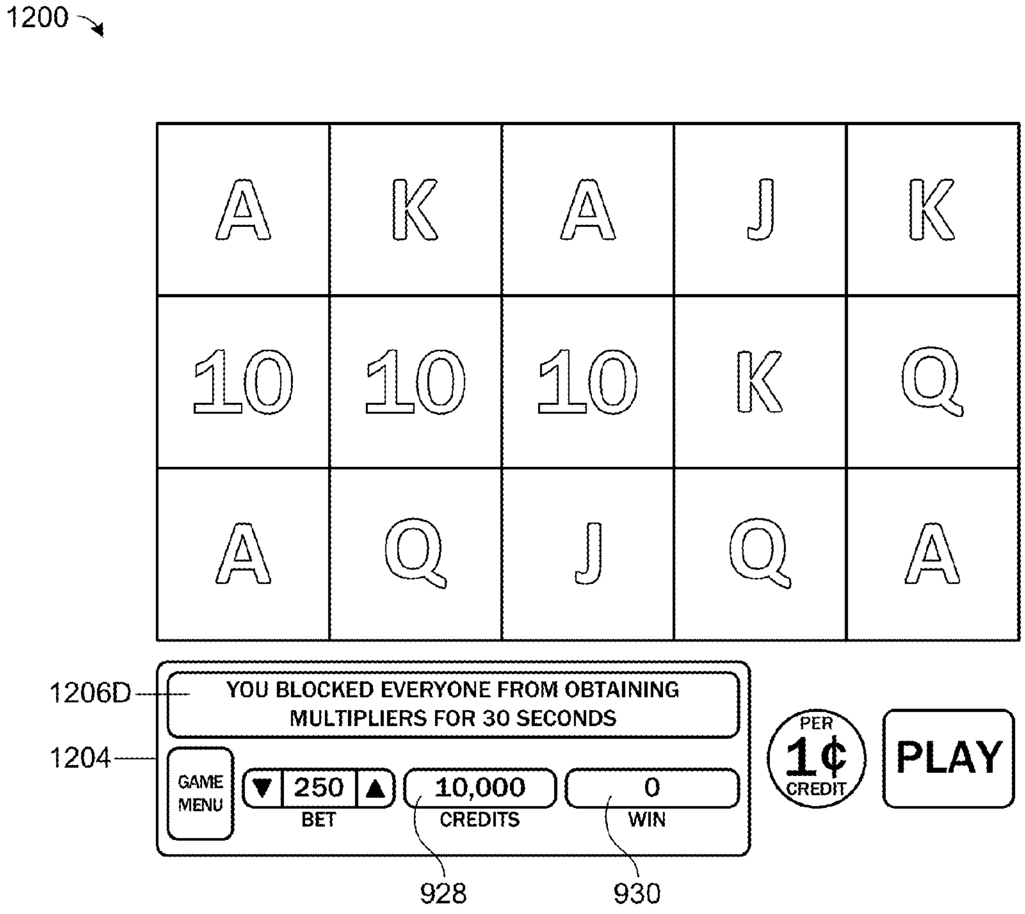
FIG. 12D is another illustration of tournament game play, according to one embodiment.

FIG. 12D is an illustration of tournament game play, according to one embodiment. FIG. 12D may show a screen image 1200 for electronic gaming device 100 and/or electronic gaming device 200 on display 318. Screen image 1200 may include game data area 1204, a modified game communication area 1206D, credit amount image 928, and win amount area 930.

Modified game communication area 1206D may display one or more messages to the player. In FIG. 12D, modified game communication area 1206D states, "YOU BLOCKED EVERYONE FROM OBTAINING MULTIPLIERS FOR 30 SECONDS". Modified game communication area 1206D may display this and/or any message.

For example, modified game communication area 1206D may display the outcome of a power-up card being played to attack another player. In FIG. 12D, the message on modified game communication area 1206D is telling the player that their power-up card was successful in blocking everyone from obtaining multipliers for a 30 second period of time during the tournament.

Figure 13:
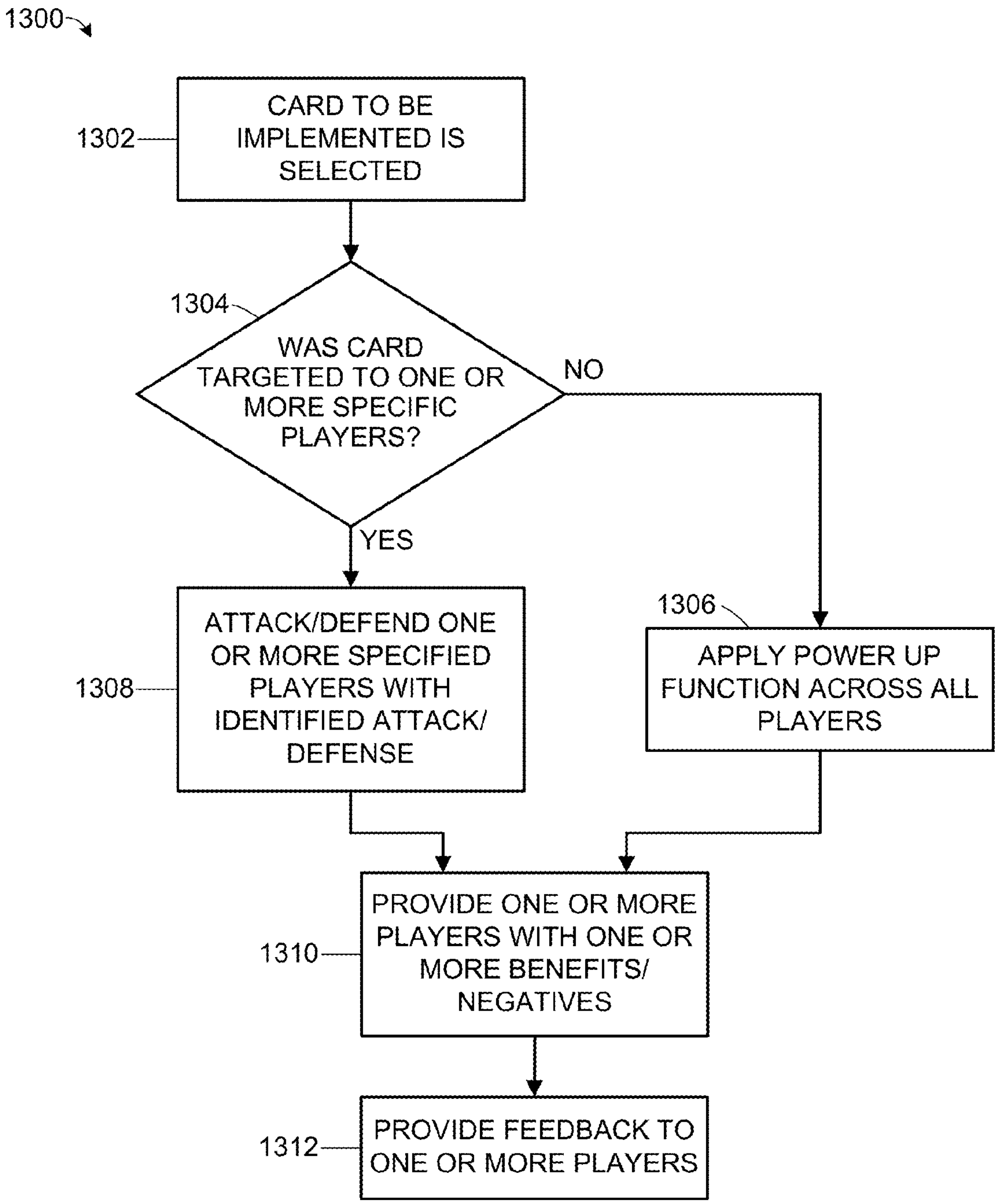
FIG. 13 is a flow diagram illustrating the use of power-up cards in a tournament game play, according to one embodiment.

FIG. 13 is a flow diagram illustrating the use of power-up cards in a tournament game play. The method may include selection of a card to be implemented (step 1302). The method may include determining if the power-up card is targeted to one or more specific players (step 1304). If the power-up card is not targeting to one or more specific players, the method may include applying one or more power-up cards (e.g., attack power-up cards and/or defense power-up cards) across all players (step 1306). If the power-up card is targeted to one or more specific players, the method may include attacking and/or defending the identified players (step 1308). The method may include providing one or more players with one or more benefits and/or damages associated with the implemented power-up card (step 1310). The method may include providing the player who played one or more power-up card(s) with feedback of the attack and/or benefit, and/or the method may include providing the player who was attacked by the power-up card feedback of the results (step 1312).

For example, when the player, "CARMEN" has a power-up card available for use, CARMEN may elect to use a "stop a specific player from playing next 5-spins" power-up card. Then CARMEN may be asked which player to use the power-up card against (e.g., attack). If CARMEN elected to use it against "SCOTT", SCOTT may then receive a notification that he was attacked by a power-up card from CARMEN and CARMEN may receive notification of the success of his attack against SCOTT. In a further example, SCOTT may be notified of the pending attack in advance and given an amount of time (e.g., 1 second, 5 seconds, 10 seconds, etc.) to shield himself if he has a shield power-up card available. In a further example, SCOTT may have implemented a "shield for next 10 plays" card, which would shield SCOTT from CARMEN's (or any other players attack). Both SCOTT and CARMEN may then receive notification of the attack and the shielding. In one example, the notification may inform the player that an attack is coming but not what type of attack. In another example, the notification may inform the attacking player that the target player has a defense up but not what type of defense is in place.

In another example, the tournament may have teams. In this example, rather than the power-up card being used against just one individual, the player may elect to use the "stop a specific player from playing next 5-spins" card against the entire team. By doing so, the entire team would have to halt play, allowing the team which implemented the power-up card to potentially move ahead. The targeted team may then be frozen out for 5-spins. In another example, by utilizing a power-up card on a team, as opposed to an individual, may dilute the functionality of the power-up card. For example, instead of the power-up card stopping one player from spinning for 5 turns, the power-up card may stop an entire team from spinning for 3 turns.

In another example, the tournament may have teams. For example, rather than the power-up card being used to defend just one individual, the player may elect to use the "shield for next 10 plays" card (or next 5 minutes, and/or any other duration), for the benefit of their entire team. By doing so, the entire team may be protected from opponent team power-up card attacks. In another example, by utilizing a power-up card for a team, as opposed to an individual, may dilute the functionality of the power-up card. For example, instead of the power-up card credit attacking one player from spinning for 5 turns, the power-up card may credit attack an entire team from spinning for 3 turns.

Figure 14:
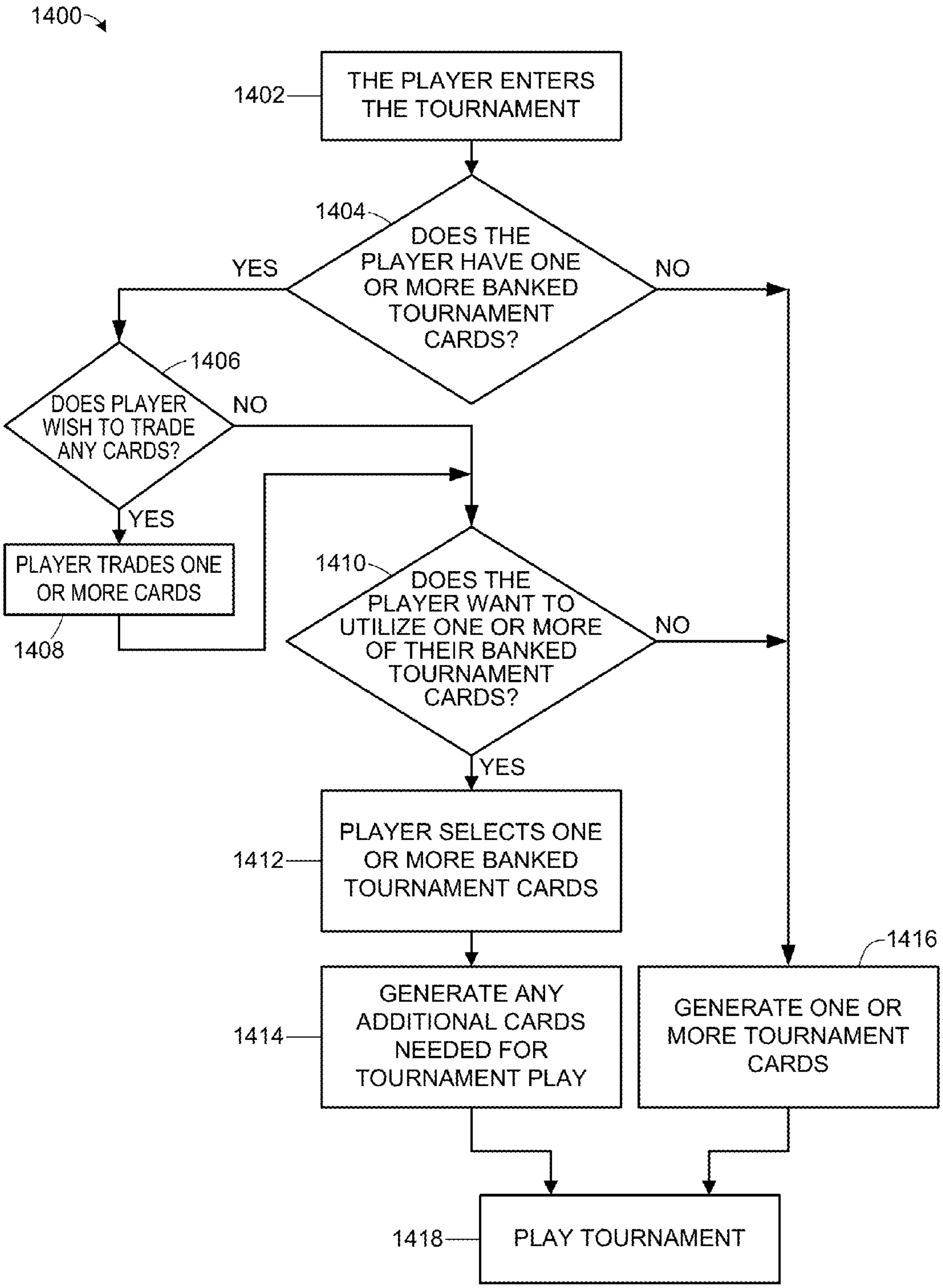
FIG. 14 is another flow diagram illustrating the use of power-up cards in a tournament game play, according to one embodiment.

FIG. 14 is a flow diagram of power-up cards being used in tournament play 1400, according to one embodiment. The method may include the player (and/or team) entering the tournament (step 1402). The method may include a determination if the player account has power-up cards banked (step 1404). The method may include, if the player has banked power-up cards, asking the player if they would like to see what power-up cards are available to trade (step 1406). If the player elects to review trading, the method may include evaluation if the player makes a trade (step 1408). If the player has power-up cards the method may include allowing the player to elect to use banked power-up cards (step 1410). In the event the player elects to use banked power-up cards, the method may include the player selecting one or more banked power-up cards (step 1412). The method may include generating additional power-up cards, if needed for tournament play (step 1414). If the player has no power-up cards and/or elects not to use the banked cards, the method may include generating one or more power-up cards (step 1416). Once the player has necessary power-up cards, the method may include playing in the tournament (step 1418).

For example, in the event the tournament allows for the use of up to five power-up cards and a player only has three power-up cards in their bank of cards, the player may be presented with a list of power-up cards from which they may select two additional power-up cards. The additional power-up cards may be offered to the player for an additional amount of credits, free, offered only to certain players (e.g., player level), offered only to frequent players, and/or any other criteria.

In another example, five power-up cards are necessary for play. If the player chooses to only utilize one of their banked power-up cards, they may be presented with a list of power-up cards from which they may select four additional power-up cards.

In another example, if the player doesn't want to be limited to utilizing their banked power-up cards, the player may elect to go to a power-up card trading bank. In the trading bank, other players may list power-up cards they are willing to trade and/or which power-up cards they would like to receive. For instance, Player A may put a "Steal Wins for Next 5 Spins" power-up card on the available listing. Player B may want Player A's power-up card and will offer "Shield for 5 minutes" power-up card in return. Player A may then receive a message notifying Player A of Player B's desire to trade. Player A may elect to accept or deny the trade.

In another example, card trading module 428 may be automated. Player A may be planning on leaving the casino, but wants to still allow a trade to take place in their absence. Player A may put a "Steal Wins for Next 5 Spins" power-up card on the available listing along with which cards Player A is willing to accept in return (e.g., Player A wants any "Shield" power-up cards and is willing to give a "Steal Wins for Next 5 Spins", Player A wants a "Steal Wins for Next 2 Spins" power-up card and is willing to give any "Shield" power-up cards, etc.). In another example, the list may include one or more cards that would be acceptable to the player to automatically complete one or more trades.

In another example, power-up cards may have a ranking assigned. In this situation Player A may say they will trade the "Steal Wins for Next 5 Spins" power-up card for any card with a rank in excess of a predetermined level (e.g., 1-N). Power-up cards may be ranked by any method of ranking (e.g., point value, school grade (A-F), metal (Gold, Silver, Bronze, Iron, Lead), etc.).

Figure 15A:
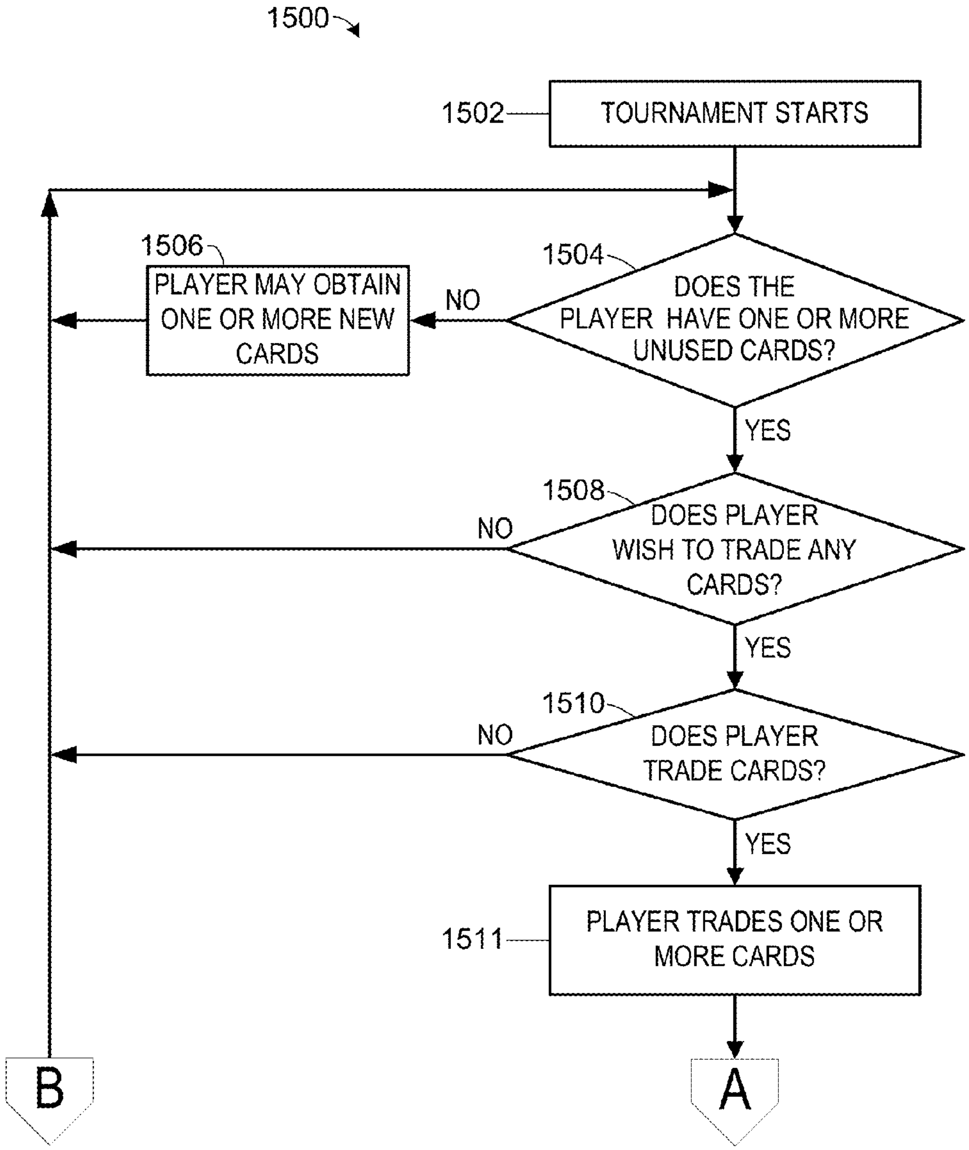
FIG. 15A is a first part of a flow diagram illustrating the use of power-up cards in a tournament game play, according to one embodiment.
Figure 15B:
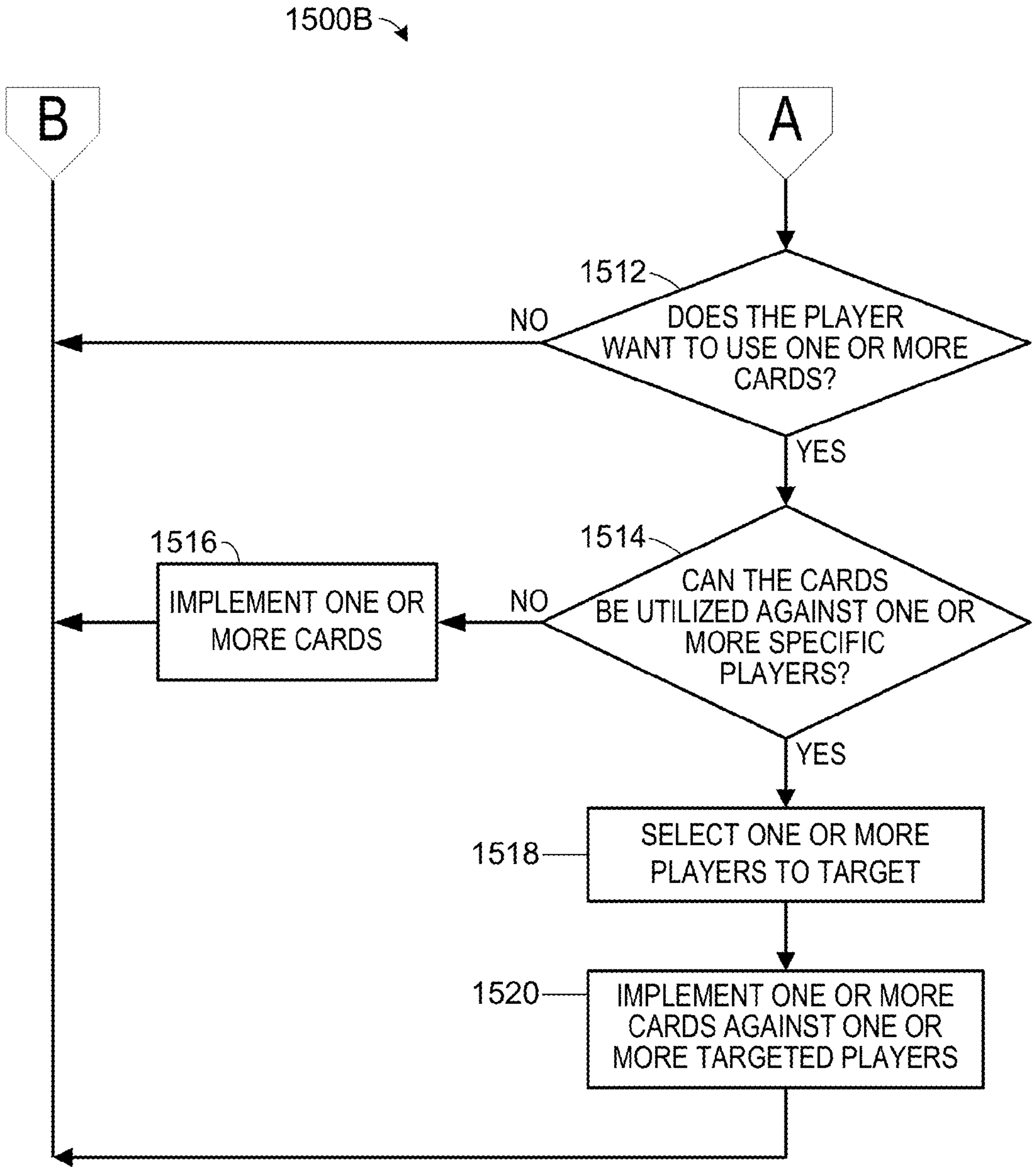
FIG. 15B is a second part of a flow diagram illustrating the use of power-up cards in a tournament game play, according to one embodiment.

FIG. 15 is a flow diagram of tournament play with use of power-up cards, according to one embodiment. The method may include the tournament starting (step 1502). The method may include determining if the player has one or more unused power-up cards (step 1504). If the player does not have one or more unused power-up cards, the player may be asked to get a power-up card (step 1506). The method may include if the player has banked power-up cards, asking the player if they would like to see what power-up cards are available to trade (step 1508). If the player elects to review trading, the method may include evaluation if the player makes a trade (step 1510). If the player does have available power-up cards, the method may include asking the player if they want to use one or more of their power-up cards (step 1512). If the player chooses to use one or more of their banked power-up cards, the method may include determining if the power-up card can be utilized against one or more specific players (step 1514). If the power-up card cannot be used against specific players, it may be applied to all the players (step 1516). If the power-up card may be utilized against one or more specific players, the player may be asked to select a player or players to target (step 1518). The method may then include implementing one or more cards against one or more targeted players (step 1520). The method may return to step 1504.

For example, if the player does not have one or more unused cards the player may be directed by electronic gaming device 100 and/or electronic gaming device 200 and/or any other source of direction, to the location where they may obtain power-up cards for use in the tournament. The player may be directed to any source for obtaining cards (e.g., bartender, tournament host/hostess, a location within the casino, and/or any other location where a power-up card could be distributed to players).

In another example, when the player has a power-up card available for use, the player may elect to use a "steal one spin from all players" power-up card. The player would then receive one spin from each player who has not utilized an "all shield" and/or spin shield power-up card.

In another example, when the player has a power-up card available for use, the player may elect to use a "shield from other player spin attack" power-up card. The player in the example above would then not receive one spin from the player who has utilized the spin shield power-up card because they were protected against a spin attack. The player could have also utilized an all shield power-up card.

One or more tournament presentations may be based on a first theme (e.g., pirates), a second theme (e.g., cars), a third theme (e.g., horses), a fourth theme (e.g., perceived skill), a fifth theme (e.g., a specific movie), a sixth theme (e.g., a sporting event), a seventh theme (e.g., outer space), an eight theme (e.g., flowers), a ninth theme (e.g., food), a tenth theme (e.g., a skill based presentation), an eleventh theme (e.g., trivia), a twelve theme (e.g., pick a bonus), a thirteenth theme (e.g., ghost), a fourteenth theme (e.g., natural events), on a fifteenth theme (e.g., a mineral—gold, silver, etc.), and/or a sixteenth theme (e.g., mythology). One, a few, a plurality, and/or all of these presentations may be themed based.

In another embodiment, the method of providing gaming options via an electronic gaming device may include receiving one or more primary wagers on one or more paylines, starting a bonus game, determining one or more values, and/or selecting one or more presentations based on the one or more values.

In an exemplary embodiment, an electronic gaming device may include a plurality of reels. The plurality of reels may include a plurality of symbols. The electronic gaming device may include a first payline, a second payline, and a memory. The memory may include a payline module. The payline module may include a plurality of payline structures. The electronic gaming device may include a processor. The processor may receive primary wagers on one or more paylines. The processor may receive one or more secondary wagers on one or more selected paylines (e.g., repeat paylines, patterns, scenarios, etc.). The selected paylines may be based on data received from a player. The processor may determine a selected payline's payout based on the one or more selected paylines (e.g., repeat paylines, patterns, scenarios, etc.).

In another embodiment, the processor may determine a payout based on the primary wagers. The electronic gaming device may include a network interface, which may receive data from at least one of a server and one or more gaming devices. The electronic gaming device may include a display, which may display one or more selected paylines.

In another example, the display may shade one or more non-selected paylines. The electronic gaming device may include a player preference input device. The player preference input device may modify a game configuration based on data from an identification device. The processor may multiply a prize value based on a selected payline occurrence.

In another example, the method may include displaying a game status image. The method may also include shading one or more completed objectives (e.g., tournament level selecting any element, obtaining a repeat payline, etc.).

In another embodiment, the electronic gaming system may include a server. The server may include a server memory, a server processor, and a signage server. The server memory may include historical gaming data. The server processor may generate a gaming message based on the historical gaming data. The signage server may transmit the gaming message.

In another example, the gaming message may be transmitted to an internal display of a gaming entity. The internal display may be a non-gaming device display. The gaming message may be transmitted to an external display of a gaming entity. The external display may be located outside of a gaming entity. The gaming message may be transmitted to at least one of a top display, a main display, and a side display.

The plurality of reels may form a 5-by-5 matrix, a 3-by-5 matrix, a 4-by-5 matrix, a 4-by-3 matrix, a 5-by-3 matrix, or any number-by-any number matrix. The symbols may be an image of a card, an image, and/or other objects. For example, it could be a pot of gold, an ace of spades, a diamond, or any other symbol. The symbols may be animation. The symbols may be a picture. For example, it may be a picture of the player as taken by camera 312. The symbols may be a number. The symbols may be any image. The symbols may be blank.

The disclosed features may be part of the base game, a bonus game, and/or tournament game play. In addition, the disclosed features may be part of a base bet and/or may require an additional side bet (e.g., ante bet).

In one embodiment, the electronic gaming device may include a plurality of reels. One or more paylines may be formed on at least a portion of the plurality of reels. The electronic gaming device may include a memory and one or more processors. The memory may include one or more tournament game structures. The memory may further include one or more power-up card structures. The one or more processors may initiate one or more tournaments based on one or more tournament game structures.

In another example, the one or more processors may receive one or more power-up card commands. In one example, the one or more processors may transmit the received one or more power-up card commands to at least one of a central server and one or more external electronic gaming devices. In another example, the one or more processors may receive one or more responses from the at least one of the central server and the one or more external electronic gaming devices relating to the transmitted one or more power-up card commands. In another example, the one or more processors may generate one or more notifications based on the one or more responses. In another example, the one or more processors may display the one or more notifications. In one example, the one or more power-up card commands are attack commands. In another example, the one or more power-up card commands are defense commands. In another example, the one or more power-up card commands are one or more attack commands and one or more defense commands.

In one embodiment, the method of providing tournament gaming options via an electronic gaming device may include starting one or more tournaments and receive one or more power-up card commands.

In another example, the method may include transmitting the received one or more power-up card commands to at least one of a central server and one or more external electronic gaming devices. In another example, the method may include receiving one or more responses from the at least one of the central server and the one or more external electronic gaming devices relating to the transmitted one or more power-up card commands. In one example, the method may include generating one or more notifications based on the one or more responses. The method may include displaying the one or more notifications. In another example, the one or more power-up card commands are attack commands.

In one embodiment, the electronic gaming system may include a server with a server memory and a server processor. The server memory may include one or more tournament game structures. The server memory may also include one or more power-up card structures. The server processor may initiate the one or more tournaments based on one or more tournament game structures.

In one example, the server processor may receive one or more power-up card commands. The server processor may transmit the received one or more power-up card commands to one or more external electronic gaming devices. The server processor may generate one or more responses based on the received one or more power-up card commands and data received from the one or more external electronic gaming devices. The one or more power-up card commands may relate to at least one of an attacking command and a defending command.

In various examples, other types of symbols may be utilized instead of cards, such as, tokens, barcoded tickets, any other form of media to represent a special power-up (e.g., special skill power up, attack power-up, defense power-up, etc.), physical items, virtual items, and/or any combination thereof.

In one embodiment, the electronic gaming device may include a plurality of reels, a memory, and/or one or more processors. One or more paylines may be formed on the plurality of reels. The memory may include one or more tournament game structures. The memory may also include one or more power-up structures. The one or more processors may initiate the one or more tournaments based on one or more tournament game structures.

In another example, the one or more processors may receive one or more power-up commands (e.g., via tokens, barcoded tickets, any other form of media to represent a special power-up (e.g., special skill power up, attack power-up, defense power-up, etc.), physical items, virtual items, and/or any combination thereof). In another example, the one or more processors may transmit the received one or more power-up commands to a central server, one or more internal computing devices, one or more external electronic gaming devices, and/or one or more external computing devices. In another example, the one or more processors may receive one or more responses from the central server, one or more internal computing devices, one or more external electronic gaming devices, and/or one or more external computing devices relating to the transmitted one or more power-up commands. In one example, the one or more processors may generate one or more notifications based on the one or more responses. In an example, the one or more processors may display the one or more notifications. In another example, the one or more power-up commands are attack commands. In another example, the one or more power-up commands are defense commands. In an example, the one or more power-up commands are one or more attack commands and one or more defense commands.

In another embodiment, the method of providing tournament gaming options via an electronic gaming device may include starting one or more tournaments. The method may include receiving one or more power-up commands. The method may include transmitting the received one or more power-up commands to at least one of a central server and one or more external electronic gaming devices. The method may include receiving one or more responses from the central server, one or more internal computing devices, one or more external electronic gaming devices, and/or one or more external computing devices relating to the transmitted one or more power-up commands.

In another example, the method may include generating one or more notifications based on the one or more responses. The method may include displaying the one or more notifications. The method may include that the one or more power-up commands are attack commands.

In another embodiment, the electronic gaming system may include a server which includes a server memory and a server processor. The server memory may include one or more tournament game structures. The server memory may include one or more power-up structures. The server processor may initiate the one or more tournaments based on one or more tournament game structures.

In another example, the server processor may receive one or more power-up commands. In one example, the server processor may transmit the received one or more power-up commands to one or more external electronic gaming devices.

In another example, the server processor may generate one or more responses based on the received one or more power-up commands and data received from the one or more external electronic gaming devices. In another example, the one or more power-up commands may relate to one or more attacking commands and/or one or more defending commands.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:

a credit device configured to accept an item associated with a monetary value;

at least one input device configured to enable a first player to select a wager amount and initiate game play where the wager amount is subtracted from a first player credit balance and where the first player credit balance is funded at least in part via the credit device during a non-tournament game play mode, said input device further configured to receive input from said first player of said electronic gaming device of a selected power-up card selected from one or more power-up cards;

a memory, the memory including one or more tournament game structures defining game play between said first player and at least one second player of at least one second gaming device comprising at least information regarding said power-up cards and at least one power-up card game action associated with each power-up card, wherein one or more of said power-up card game actions comprise at least one action implemented against at least one of said second players; and one or more processors configured to implement one or more of said plurality of tournament gaming structures comprising executing said power-up card game action associated with said selected power-up card selected by said first player, said action being a credit taking function which moves credits from a second player credit balance of a second player at one or more of said second gaming devices to said first player credit balance, thereby reducing said second player credit balance by a number of credits and increasing said first player credit balance by said number of credits.

2. The electronic gaming device of claim 1, wherein the one or more processors are further configured to transmit the received one or more power-up card commands to at least one of a central server and said one or more of said second gaming devices.

3. The electronic gaming device of claim 2, wherein the one or more processors are further configured to receive one or more responses from the at least one of the central server and said one or more of said second gaming devices relating to the transmitted one or more power-up card commands.

4. The electronic gaming device of claim 3, wherein the one or more processors are further configured to generate one or more notifications based on the one or more responses.

5. The electronic gaming device of claim 4, wherein the one or more processors are further configured to display the one or more notifications.

6. The electronic gaming device of claim 1, further comprising displaying said first player balance as increased by said number of credits to said first player via at least one display device of said electronic gaming device.

7. The electronic gaming device of claim 1, wherein the processor is further configured to implement one or more non-tournament games to said first player independent of a game played by said second player.

8. A method of providing tournament gaming options via an electronic gaming system comprising:

providing at least two electronic gaming devices, each electronic gaming device comprising:

a credit device configured to accept an item associated with a monetary value; and at least one input device configured to enable at least a first and second player to select respective first and second player wager amounts and initiate game play where the wager amounts are subtracted from a respective first and second player credit balance, the respective first and second player credit balances being funded at least in part via the credit device during a non-tournaments game play mode, said input device further configured to receive input from said first and second players of said electronic gaming devices of a selected power-up card selected from one or more power-up cards;

providing a central server communicating with said at least two electronic gaming devices, said central server comprising:

a memory, the memory including one or more tournament game structures defining game play between said first and second players and comprising executable instructions regarding said power-up cards, at least one of said power-up cards having an opposing player game action, said opposing player game action comprising an action implemented against at least one opposing player; and one or more server processors configured to implement one or more of said plurality of tournament gaming structures relative to said at least two electronic gaming devices, including executing instructions regarding said at least one power-up card opposing player game action;

starting one or more tournaments; and executing said instructions regarding one or more power-up card commands, at least one of said power-up card commands including an opposing player game action comprising a credit taking function operative to move credits from said second player credit balance to said first player credit balance, thereby reducing said second player credit balance by a number of credits and increasing said first player credit balance by said number of credits.

9. An electronic gaming system comprising:

at least two electronic gaming devices, each electronic gaming device comprising:

a credit device configured to accept an item associated with a monetary value;

at least one input device configured to enable at least a first and second player to select respective first and second player wager amounts and initiate game play where the wager amounts are subtracted from a respective first and second player credit balance, the respective first and second player credit balances being funded at least in part via the credit device during a non-tournament game play mode, said input device further configured to receive input from said first and second players of said electronic gaming devices of a selected power-up card selected from one or more power-up cards; and a central server communicating with said at least two electronic gaming devices, said central server comprising:

a memory, the memory including one or more tournament game structures defining game play between said at least first and second players comprising at least information regarding said power-up cards and at least one power-up card game action associated with each power-up card, wherein one or more of said power-up card game actions comprise at least one opposing player game action configured to be implemented against at least one opposing player; and one or more server processors configured to implement said tournament gaming structures relative to said at least two electronic gaming devices, including execution of said power-up card game actions, including an opposing player game action which is a credit taking function operative to move credits from said second player credit balance to said first player credit balance, thereby reducing said second player credit balance by a number of credits and increasing said first player credit balance by said number of credits said opposing player game action operative to affect an outcome of at least one game event played by said at least one opposing player.

10. The electronic gaming system in accordance with claim 9 wherein at least one other of said power-up game actions associated with one or more of said power-up cards comprises an offensive or defensive opposing player game action which affects an outcome of said game play between said first and second players.

11. The method in accordance with claim 8 wherein at least one other of said power-up game actions associated with one or more of said power-up cards comprises an offensive or defensive opposing player game action which affects an outcome of said game play between said first and second players.

12. The electronic gaming device of claim 7, wherein said selected power-up card was obtained by said first player during play of said one or more non-tournament games.

13. The method of claim 8, further comprising transmitting the received one or more power-up card commands to at least one of a central server and the at least two electronic gaming devices.

14. The method of claim 13, further comprising receiving one or more responses from the at least one of the central server and the at least two electronic gaming devices relating to the transmitted one or more power-up card commands.

15. The method of claim 14, further comprising generating one or more notifications based on the one or more responses.

16. The method of claim 15, further comprising displaying the one or more notifications.

17. The method of claim 8, wherein the one or more power-up cards are accrued during game play apart from said one or more tournaments.

18. The electronic gaming system of claim 9, wherein the server processor is further configured to receive input regarding said selected power-up card.

19. The electronic gaming system of claim 18, wherein the server processor is further configured to transmit the received one or more power-up card commands to the at least two electronic gaming devices.

20. The electronic gaming system of claim 19, wherein the server processor is further configured to generate one or more responses based on the received one or more power-up card commands and data received from the at least two electronic gaming devices.

* * * * *